United States Patent
Donovan

(10) Patent No.: US 7,920,530 B2
(45) Date of Patent: *Apr. 5, 2011

(54) WLAN TDM IFS TIME SELECTION PROTOCOL

(75) Inventor: Timothy J. Donovan, Livermore, CA (US)

(73) Assignee: Marvell World Trade Ltd., St. Michael (BB)

(*) Notice: Subject to any disclaimer, the term of this patent is extended or adjusted under 35 U.S.C. 154(b) by 638 days.

This patent is subject to a terminal disclaimer.

(21) Appl. No.: 11/321,914

(22) Filed: Dec. 29, 2005

(65) Prior Publication Data
US 2007/0165556 A1   Jul. 19, 2007

Related U.S. Application Data

(63) Continuation of application No. 11/311,890, filed on Dec. 19, 2005, now Pat. No. 7,751,374.

(60) Provisional application No. 60/645,520, filed on Jan. 18, 2005, provisional application No. 60/682,067, filed on May 18, 2005.

(51) Int. Cl.
*H04W 4/00* (2009.01)
*H04J 3/16* (2006.01)

(52) U.S. Cl. .................. 370/338; 370/346

(58) Field of Classification Search .................. 370/338, 370/318, 346
See application file for complete search history.

(56) References Cited

U.S. PATENT DOCUMENTS

| | | | |
|---|---|---|---|
| 5,991,279 A | 11/1999 | Haugli et al. | |
| 6,055,578 A * | 4/2000 | Williams et al. | 709/253 |
| 6,272,121 B1 | 8/2001 | Smith et al. | |
| 6,473,414 B1 * | 10/2002 | Hartley et al. | 370/338 |
| 6,862,270 B1 * | 3/2005 | Ho | 370/328 |
| 7,046,650 B2 | 5/2006 | Sherman | 370/338 |
| 7,046,651 B2 | 5/2006 | Terry | 370/338 |
| 2002/0075819 A1 | 6/2002 | Kumar et al. | |
| 2002/0089956 A1 | 7/2002 | Haugli et al. | |
| 2002/0181426 A1 * | 12/2002 | Sherman | 370/338 |
| 2003/0016732 A1 | 1/2003 | Miklos et al. | |
| 2003/0103472 A1 | 6/2003 | Taylor et al. | |
| 2003/0125087 A1 | 7/2003 | Shimizu | |
| 2004/0218620 A1 * | 11/2004 | Palm et al. | 370/445 |

(Continued)

FOREIGN PATENT DOCUMENTS

EP  1 233 574 A  8/2002

(Continued)

OTHER PUBLICATIONS

Communication from the European Patent Office dated Jan. 10, 2007 with the extended European Search Report for Application No. 06 000 608.7-2416; 8 pages.

(Continued)

*Primary Examiner* — Rafael Pérez-Gutiérrez
*Assistant Examiner* — Allahyar Kasraian

(57) ABSTRACT

A first wireless network device in a wireless network that includes a plurality of wireless network devices comprises an RF transceiver that transmits and receives data packets and that periodically transmits or receives a beacon. A control module communicates with the RF transceiver, determines a transmission position m and a default IFS time based on the beacon, selects a second IFS time when the RF transceiver receives a data packet from a second wireless network device having a transmission position m−1, and selects the default IFS time when the RF transceiver does not receive a data packet from the second wireless network device.

25 Claims, 16 Drawing Sheets

U.S. PATENT DOCUMENTS

| | | | |
|---|---|---|---|
| 2004/0246932 A1 | 12/2004 | Fischer | 370/338 |
| 2004/0253996 A1* | 12/2004 | Chen et al. | 455/574 |
| 2005/0009578 A1* | 1/2005 | Liu | 455/574 |
| 2005/0025131 A1* | 2/2005 | Ko et al. | 370/352 |
| 2005/0047383 A1 | 3/2005 | Yoshida | 370/338 |
| 2005/0089001 A1* | 4/2005 | Nishikawa | 370/338 |
| 2005/0094591 A1 | 5/2005 | Kwon | |
| 2005/0135318 A1 | 6/2005 | Walton et al. | 370/338 |
| 2005/0163150 A1* | 7/2005 | Yang et al. | 370/445 |
| 2005/0185628 A1 | 8/2005 | Watanabe et al. | 370/347 |
| 2005/0195771 A1 | 9/2005 | Matsunaga et al. | 370/22 |
| 2006/0034178 A1* | 2/2006 | Yang et al. | 370/236 |
| 2006/0227801 A1* | 10/2006 | Nanda et al. | 370/447 |
| 2007/0041398 A1 | 2/2007 | Benveniste | 370/448 |
| 2007/0165589 A1 | 7/2007 | Sakoda | 370/345 |
| 2009/0097464 A1* | 4/2009 | Sakoda | 370/338 |

FOREIGN PATENT DOCUMENTS

| | | |
|---|---|---|
| WO | WO 02/41590 A | 5/2002 |
| WO | WO 03/085891 | 10/2003 |

OTHER PUBLICATIONS

Communication from the European Patent Office dated Jan. 5, 2007 with the First Examination Report for Application No. 06 000 609.5-2416; 6 pages.

Communication from the European Patent Office dated Jan. 5, 2007 with the First Examination Report for Application No. 06 000 610.3-2416; 6 pages.

Written Opinion and Search Report from the Intellectual Property Office of Singapore dated Feb. 22, 2007 for Application No. 200600515-1; 15 pages.

Written Opinion and Search Report from the Intellectual Property Office of Singapore dated Feb. 22, 2007 for Application No. 200600519-3; 15 pages.

Written Opinion and Search Report from the Intellectual Property Office of Singapore dated Jun. 15, 2007 for Application No. 200600514-4; 8 pages.

First Official Communication from the European Patent Office dated May 23, 2007 for Application No. 06 000 608.7-2416; 6 pages.

Communication from the European Patent Office dated Jun. 6, 2006 with the extended European Search Report for Application No. 06000609.5-2416; 8 pages.

Communication from the European Patent Office dated Jun. 6, 2006 with the extended European Search Report for Application No. 06000610.3-2416; 8 pages.

Lopex-Aguilera E. et al; IEEE 802.11g; Performance in Presence of Beacon Control Frames; 2004; pp. 318-322.

Stine J. A. et al; "Tactical Communications using the IEEE 802.11 MAC Protocol"; 1998; pp. 575-582.

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

IEEE Std 802.11a—1999 (Supplement to IEEE Std 802.11—1999) [Adopted by ISO/IEC and redesignated as ISO/IEC 8802—11: 1999/ Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b—1999 (Supplement to IEEE Std 802.11—1999 Edition); Supplement to IEEE Standard for Information technology—Telecommunications and information exchange between systems—Local and metropolitan area networks—Specific requirements-Part 11: Wireless LAN Medium Access Control (MAC) and Physical Layer (PHY) specifications: Higher—Speed Physical Layer Extension in the 2.4 GHz Band; LAN/MAN Standards Committee of the IEEE Computer Society; Sep. 16, 1999 IEEE—SA Standards Board; 96 pages.

IEEE Std 802.11h—2003 (Amendment to IEEE Std 802.11, 1999 Edition (Reaff 2003)); as amended by IEEE Stds 802.11a—1999, 802.11b—1999, 802.11b—1999/Cor 1—2001, 802.11d—2001, and 802.11g—2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

IEEE 802.11—04/0889r6; IEEE P802.11 Wireless LANs, Gn Sync Proposal Technical Specification; May 2005; 131 pages.

IEEE 802.20—PD—06, IEEE P 802.20TMV14, Draft 802.20 Permanent Document, System Requirements for IEEE 802.20 Mobile Broadband Wirelss Access Systems—Version 14; Jul. 16, 2004; 23 pages.

IEEE Std. 802.16—2004 (Revision of IEEE Std. 802.16—2001), IEEE Standard for Local and metropolitan area networks, Part 16: Air Interface for Fixed Broadband Wireless Access Systems; IEEE Computer Society and the IEEE Microwave Theory and Techniques Society; Oct. 1, 2004; 893 pages.

IEE Std 802.11b—1999/Cor 1—2001 (Corrigendum to IEEE Std 802.11—1999); IEEE Standard for Information technology—Telecommunications and information exchange between systems—Local and metropolitan area networks-Specific requirements-Part 11: Wireless LAN Medium Access Control (MAC) and Physical Layer (PHY) specifications Amendment 2: Higher—Speed Physical Layer (PHY) extension in the 2.4 GHz Band—Corrigendum 1; LAN/MAN Standards Committee of the IEEE Computer Society; Nov. 7, 2001; 24 pages.

IEEE P802.11g/D8.2, Apr. 2003 (Supplement to ANSI/IEEE Std 802.11—1999(Reaff 2003)); DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

\* cited by examiner

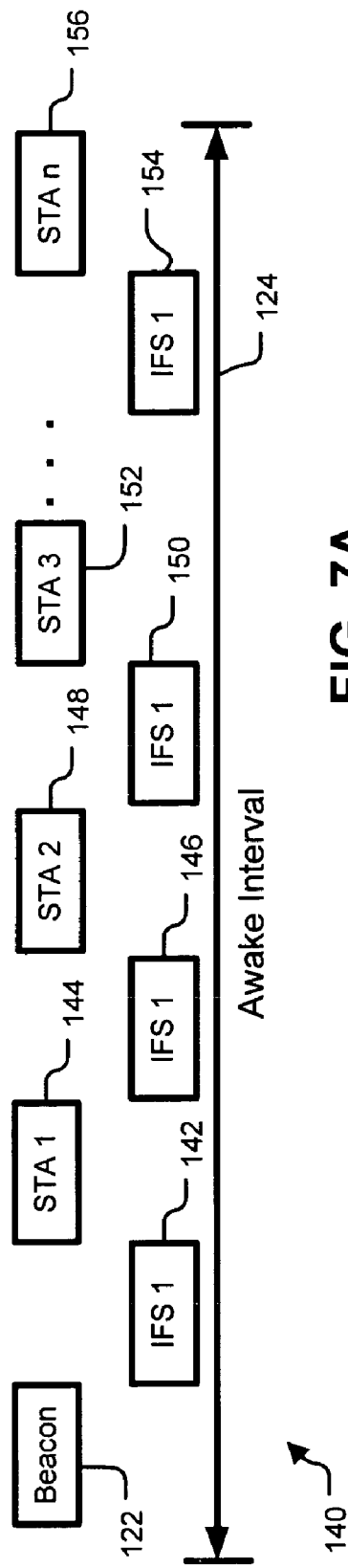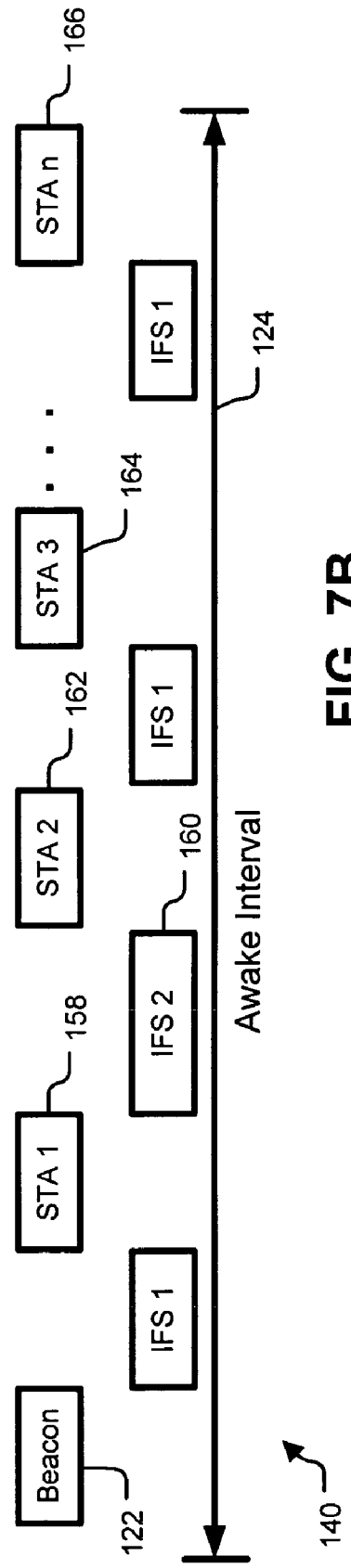

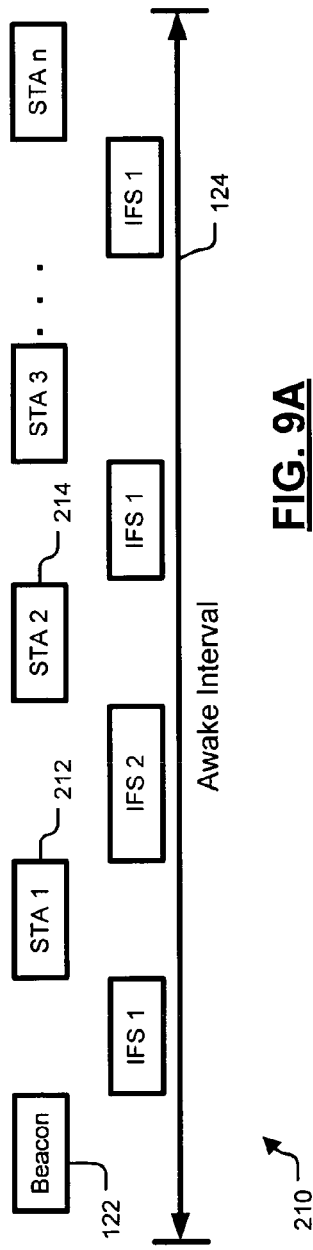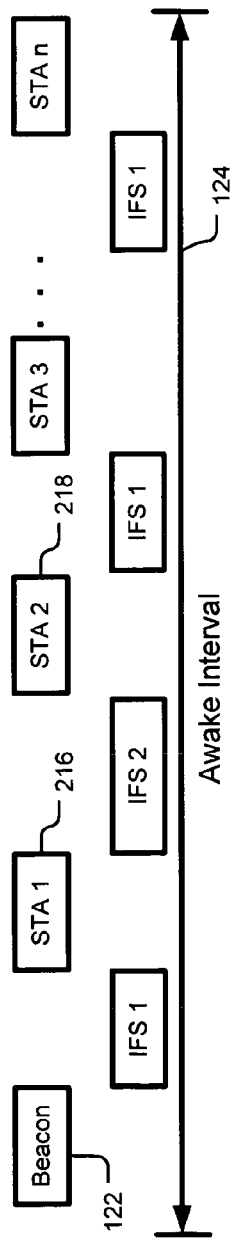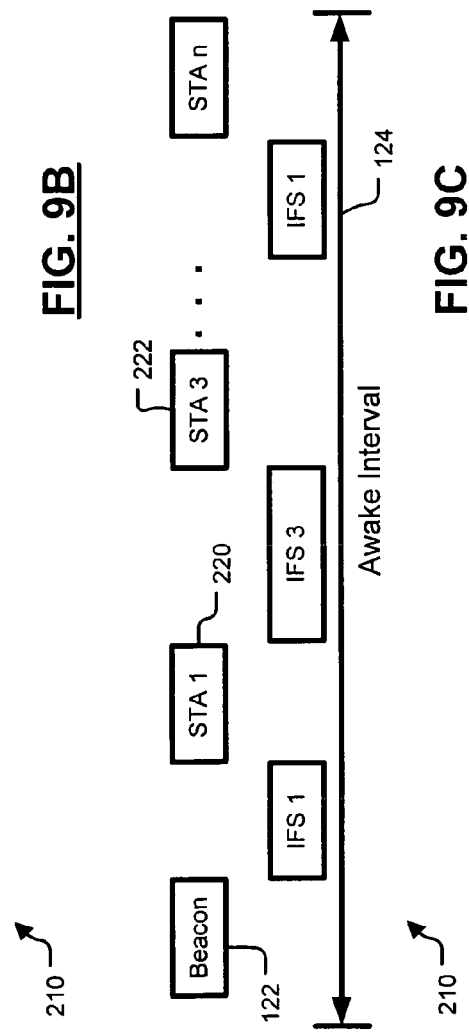

WLAN TDM IFS TIME SELECTION PROTOCOL

CROSS-REFERENCE TO RELATED APPLICATIONS

This application is a continuation of U.S. patent application Ser. No. 11/311,890, filed on Dec. 19, 2005, now issued as U.S. Pat. No. 7,751,374. This application claims the benefit of U.S. Provisional Application No. 60/645,520, filed on Jan. 18, 2005 and U.S. Provisional Application No. 60/682,067 filed on May 18, 2005. The disclosures of the above applications are incorporated herein by reference.

FIELD OF THE INVENTION

The present invention relates to wireless networks, and more particularly to reducing power consumption of wireless network devices and improving network utilization.

BACKGROUND OF THE INVENTION

IEEE standards 802.11, 802.11a, 802.11b, 802.11g, 802.11h, 802.11 n, 802.16, and 802.20, which are hereby incorporated by reference in their entirety, define several different standards for configuring wireless networks and devices. According to these standards, wireless network devices may be operated in either an infrastructure mode or an ad-hoc mode.

In the infrastructure mode, the wireless network devices or client stations communicate with each other through an access point. In the ad-hoc mode, the wireless network devices communicate directly with each other and do not employ an access point. The term client station or mobile station may not necessarily mean that a wireless network device is actually mobile. For example, a desktop computer that is not mobile may incorporate a wireless network device and operate as a mobile station or client station.

A wireless network that operates in the infrastructure mode includes an access point (AP) and at least one client station that communicates with the AP. For example, the wireless network may operate in an infrastructure mode. Since the client stations are often battery powered, it is important to minimize power consumption to preserve battery life. Therefore, some client stations implement a low power mode and an active, or "awake," mode. During the active mode, the client station transmits and/or receives data. During the low power mode, the client station shuts down components and/or alters operation to conserve power. Usually, the client station is not able to transmit or receive data during the lower power mode.

Wireless network devices may be implemented by a system on chip (SOC) circuit that includes a baseband processor (BBP), a medium access controller (MAC) device, a host interface, and one or more processors. A host communicates with the wireless network device via the host interface. The SOC circuit may include a radio frequency (RF) transceiver or the RF transceiver may be located externally. The host interface may include a peripheral component interface (PCI) although other types of interfaces may be used.

A power management device controls and selects different operating modes of the client stations. During operation, the power management device instructs some of the modules to transition to a low power mode to conserve power. Additional information may be found in U.S. patent application Ser. No. 10/650,887, filed on Aug. 28, 2003, Ser. No. 10/665,252, filed on Sep. 19, 2003, and Ser. No. 11/070,481 filed on Mar. 2, 2005, which are hereby incorporated by reference in their entirety.

Referring now to FIG. 1, a first wireless network 10 is illustrated in an infrastructure mode as defined by IEEE 802.11 and other future wireless standards. The first wireless network 10 includes one or more client stations 12 and one or more access points (AP) 14. The client station 12 and the AP 14 transmit and receive wireless signals 16. The AP 14 is a node in a network 18. The network 18 may be a local area network (LAN), a wide area network (WAN), or another network configuration. The network 18 may include other nodes such as a server 20 and may be connected to a distributed communications system 22 such as the Internet.

The client station 12 does not continuously transmit data to or receive data from the AP 14. Therefore, the client station 12 implements a power savings mode when the client station 12 and the AP 14 do not have data to exchange. Data commonly remains intact in a network for a predetermined amount of time before it is dropped. The incorporated IEEE standards provide the opportunity for the client station 12 to inform the AP 14 when the client station 12 is entering a low power mode (and will not be capable of receiving data for a predetermined period). After notifying the AP 14, the client station 12 transitions to the low power mode. During the low power period, the AP 14 buffers data that is intended to be transmitted to the client station 12. Following the low power period, the client station 12 powers up and receives beacon transmissions from the AP 14. If the beacon transmissions indicate that the AP 14 has data for the client station 12, or the host processor of the client station 12 indicates it has data to transmit, the client station 12 remains active. Otherwise, the client station 12 enters the low power mode again.

The AP 14 attempts to transmit a beacon at a target beacon transmission time (TBTT). Before the AP 14 sends out a beacon transmission, the AP 14 determines whether other devices are currently transmitting data so that other devices are able to use the network. The client station 12 transitions to the active mode prior to a beacon transmission to queue frames to transmit to the AP 14 in a buffer. Immediately following a beacon transmission, the AP 14 can exchange frames with one or more client stations 12 in a deterministic order. For example, the AP 14 and the clients stations 12 may exchange data according to Time Division Multiplexed (TDM) protocol. The use of TDM protocol minimizes collisions that may occur when one or more of the client stations 12 attempt to transmit data to the AP 14 simultaneously. However, other wireless networks that are located near the first wireless network 10 may not operate according to the above-described TDM protocol. As such, collisions may occur between the other wireless networks and the first wireless network 10.

In another implementation, each client station 12 may wait for a random period prior to transmitting. This random period, or backoff period, reduces the likelihood that multiple client stations will attempt to transmit simultaneously. As such, a wireless network that implements the random backoff period has improved collision avoidance over a wireless network that implements a pure TDM scheme when multiple networks exist in an overlapping region. However, random backoff does not guarantee collision avoidance. In certain applications, collision avoidance is critical. For example, wireless networks that exchange multicast data typically do not include a positive acknowledgement feature. In other words, a transmitting station does not receive acknowledgement from a receiving station that the data was correctly received. Further, as a result of the random backoff periods, the time required for all stations in the wireless network to complete a set of frame exchanges is increased.

Referring now to FIG. 2, a second wireless network 24 operates in an ad-hoc mode. The second wireless network 24 includes multiple client stations 26-1, 26-2, and 26-3 that transmit and receive wireless signals 28. The client stations 26-1, 26-2, and 26-3 collectively form a LAN and communicate directly with each other. The client stations 26-1, 26-2, and 26-3 are not necessarily connected to another network. The client stations 26-1, 26-2, and 26-3 do not continuously transmit data to and receive data from each other. The client stations 26 implement a power savings mode when one of the client stations 26-1 does not have data to exchange with the other client stations 26-2 and 26-3.

The client stations 26-1, 26-2, and 26-3 are not required to buffer data as performed in the AP. For example, the client station 26-1 transmits the beacon to the other client stations 26-2 and 26-3. The client stations 26-2 and 26-3 transition to the active mode prior to the beacon transmission. During a beacon interval defined by the beacon transmission, each client station 26 transmits data in a deterministic order. For example, the client stations 26 may transmit data sequentially.

SUMMARY OF THE INVENTION

A wireless network device comprises an RF transceiver that transmits and receives data packets and that periodically transmits or receives a beacon. A control module communicates with the RF transceiver, determines a default interframe space (IFS) time based on the beacon, and that selects one of the default IFS time and a second IFS time that is less than or equal to the default IFS time based on a number of data packets received after the beacon.

In other features, the beacon includes data that is indicative of a transmission position m for the wireless network device. The control module selects the second IFS time when the RF transceiver receives m−1 data packets. The control module selects the default IFS time when the RF transceiver has received fewer than m−1 data packets.

In still other features, the control module includes an IFS timer that is reset when data packets are received. The RF transceiver transmits a data packet after one of the default IFS time and the second IFS time. A power management module transitions the wireless network device between an active mode and an inactive mode. The power management module transitions the wireless network device to the active mode prior to a scheduled beacon time. The power management module transitions the wireless network device to the inactive mode after the RF transceiver transmits a data packet. A wireless network comprising the wireless network device further comprises N other wireless network devices. The power management module transitions the wireless network device to the inactive mode after all of the N wireless network devices transmit a data packet.

In still other features, a wireless network comprises a plurality of the wireless network devices. The power management module transitions the wireless network devices to the inactive mode after an idle time on the network that is greater than a largest available IFS time. One of the wireless network devices is a coordinator that periodically transmits the beacon to the plurality of wireless network devices.

In other features, a wireless network device comprises transmitting and receiving means for transmitting and receiving data packets and for periodically transmitting or receiving a beacon. The wireless network device comprises control means for communicating with the transmitting and receiving means, for determining a default interframe space (IFS) time based on the beacon, and for selecting one of the default IFS time and a second IFS time that is less than or equal to the default IFS time based on a number of data packets received after the beacon.

In still other features, the beacon includes data that is indicative of a transmission position m for the wireless network device. The control means selects the second IFS time when the transmitting and receiving means receives m−1 data packets. The control means selects the default IFS time when the transmitting and receiving means has received fewer than m−1 data packets. The control means includes timing means for monitoring IFS times. The timing means is reset when data packets are received and the transmitting and receiving means transmits a data packet after one of the default IFS time and the second IFS time.

In still other features, the wireless network device further comprises power management means for transitioning the wireless network device between an active mode and an inactive mode. The power management means transitions the wireless network device to the active mode prior to a scheduled beacon time. The power management means transitions the wireless network device to the inactive mode after the transmitting and receiving means transmits a data packet.

In still other features, a wireless network comprising the wireless network device further comprises N−1 other wireless network devices. The power management means transitions the wireless network device to the inactive mode after all of the N wireless network devices transmit a data packet. The power management means transitions the wireless network devices to the inactive mode after an idle time on the network that is greater than a largest available IFS time. One of the wireless network devices is a coordinator that periodically transmits the beacon to the plurality of wireless network devices.

In other features, a method for transmitting and receiving data with a wireless network device comprises at least one of transmitting and receiving data packets, at least one of periodically receiving and transmitting a beacon, determining a default interframe space (IFS) time based on the beacon, and selecting one of the default IFS time and a second IFS time that is less than or equal to the default IFS time based on a number of data packets received after the beacon.

In still other features, the step of selecting includes selecting the second IFS time after receiving m−1 data packets. The step of selecting includes selecting the default IFS time when fewer than m−1 data packets are received. An IFS timer is reset when data packets are received and a data packet is transmitted after one of the default IFS time or the second IFS time.

In other features, a computer program executed by a processor comprises at least one of transmitting and receiving data packets, at least one of periodically receiving and transmitting a beacon, determining a default interframe space (IFS) time based on the beacon, and selecting one of the default IFS time and a second IFS time that is less than or equal to the default IFS time based on a number of data packets received after the beacon.

In still other features, the beacon includes data that is indicative of a transmission position m for a wireless network device. The step of selecting includes selecting the second IFS time after receiving m−1 data packets. The step of selecting includes selecting the default IFS time when fewer than m−1 data packets are received. An IFS timer is reset when data packets are received and a data packet is transmitted after one of the default IFS time or the second IFS time.

In still other features, the wireless network device is transitioned between an active mode and an inactive mode. The step of transitioning includes transitioning the wireless network device to the active mode prior to a scheduled beacon time. The step of transitioning includes transitioning the wireless network device to the inactive mode after transmitting a data packet. The wireless network device is transitioned to the inactive mode after N wireless network devices transmit a data packet, wherein N is a number of wireless network devices in a wireless network including the wireless network device. The wireless network device is transitioned to the inactive mode after an idle time on a wireless network including the wireless network device that is greater than a largest available IFS time. The beacon is transmitted to a plurality of wireless network devices.

In other features, a first wireless network device in a wireless network that includes a plurality of wireless network devices comprises an RF transceiver that transmits and receives data packets and that periodically transmits or receives a beacon. A control module communicates with the RF transceiver, determines a transmission position m and a default IFS time based on the beacon, selects a second IFS time when the RF transceiver receives a data packet from a second wireless network device having a transmission position m−1, and selects the default IFS time when the RF transceiver does not receive a data packet from the second wireless network device.

In still other features, the second IFS time is less than or equal to the default IFS time. The RF transceiver transmits a data packet after one of the default IFS time or the second IFS time. A power management module transitions the wireless network device between an active mode and an inactive mode. The power management module transitions the wireless network device to the active mode prior to a scheduled beacon time. The power management module transitions the wireless network device to the inactive mode after the RF transceiver transmits the data packet.

In still other features, a wireless network comprising the wireless network device further comprises N−1 wireless network devices. The power management module transitions the wireless network device to the inactive mode after all of the N wireless network devices transmit a data packet. A coordinator device periodically transmits the beacon to the RF transceiver. The transmission position m=2 and the second IFS time is equal to a default IFS time of the second wireless network device.

In other features, a first wireless network device in a wireless network that includes a plurality of wireless network devices comprises transmitting and receiving means for transmitting and receiving data packets and for periodically transmitting or receiving a beacon, and control means for communicating with the transmitting and receiving means, for determining a transmission position m and a default IFS time based on the beacon, for selecting a second IFS time when the transmitting and receiving means receives a data packet from a second wireless network device having a transmission position m−1, and for selecting the default IFS time when the transmitting and receiving means does not receive a data packet from the second wireless network device.

In still other features, the second IFS time is less than or equal to the default IFS time. The RF transceiver transmits a data packet after one of the default IFS time or the second IFS time. The wireless network device further comprises power management means for transitioning the wireless network device between an active mode and an inactive mode. The power management means transitions the wireless network device to the active mode prior to a scheduled beacon time. The power management means transitions the wireless network device to the inactive mode after the RF transceiver transmits the data packet.

In still other features, a wireless network comprising the wireless network device of further comprises N−1 wireless network devices. The power management means transitions the wireless network device to the inactive mode after all of the N wireless network devices transmit a data packet. The transmission position m=2 and the second IFS time is equal to a default IFS time of the second wireless network device.

In other features, a method for transmitting and receiving data with a first wireless network device in a wireless network that includes a plurality of wireless network devices comprises transmitting and receiving data packets, periodically transmitting or receiving a beacon, determining a transmission position m and a default IFS time based on the beacon, selecting a second IFS time when the first wireless network device receives a data packet from a second wireless network device having a transmission position m−1, and selecting the default IFS time when the first wireless network device does not receive a data packet from the second wireless network device.

In still other features, the second IFS time is less than or equal to the default IFS time. A data packet is transmitted after one of the default IFS time or the second IFS time. The first wireless network device is transitioned between an active mode and an inactive mode. The step of transitioning includes transitioning the first wireless network device to the active mode prior to a scheduled beacon time. The step of transitioning includes transitioning the first wireless network device to the inactive mode after the first wireless network device transmits the data packet.

In still other features, the wireless network includes N wireless network devices. The first wireless network device is transitioned to the inactive mode after all of the N wireless network devices transmit a data packet. The transmission position m=2 and the second IFS time is equal to a default IFS time of the second wireless network device.

In other features, a computer program executed by a processor comprises transmitting and receiving data packets, periodically transmitting or receiving a beacon, determining a transmission position m and a default IFS time based on the beacon, selecting a second IFS time when a first wireless network device receives a data packet from a second wireless network device having a transmission position m−1, and selecting the default IFS time when the first wireless network device does not receive a data packet from the second wireless network device.

In still other features, the second IFS time is less than or equal to the default IFS time. A data packet is transmitted after one of the default IFS time or the second IFS time. The first wireless network device is transitioned between an active mode and an inactive mode. The step of transitioning includes transitioning the first wireless network device to the active mode prior to a scheduled beacon time. The step of transitioning includes transitioning the first wireless network device to the inactive mode after the first wireless network device transmits the data packet. The transmission position m=2 and the second IFS time is equal to a default IFS time of the second wireless network device.

In other features, a wireless network device in a wireless network that includes a plurality of wireless network devices comprises an RF transceiver that transmits and receives data packets and that periodically transmits or receives a beacon. A control module communicates with the RF transceiver, determines a group identifier and a station identifier based on the beacon, and selects one of a default IFS time and a second IFS time based on a data packet received.

In still other features, the control module selects one of the default IFS time and the second IFS time based on the data packet received and at least one of the group identifier and/or the station identifier. The second IFS time is less than or equal to the default IFS time. The control module determines a group identifier x and a station identifier y based on the beacon. The control module selects the second IFS time when the data packet is received from a second wireless network device having a group identifier x−1 and a station identifier y. The control module selects the second IFS time when the data packet is received from a second wireless network device having a group identifier less than x and a station identifier y. The control module selects the default IFS time when the data packet is received from a second wireless network device having a group identifier x and a station identifier other than y.

In still other features, a group IFS time is based on the group identifier, a delta IFS time is based on the station identifier, and the default IFS time is a sum of the group IFS time and the delta IFS time. The device transmits a data packet after one of the default IFS time or the second IFS time. A power management module that transitions the wireless network device between an active mode and an inactive mode. The power management module transitions the wireless network device to the active mode prior to a scheduled beacon time. The power management module transitions the wireless network device to the inactive mode after the RF transceiver transmits the data packet. A coordinator device periodically transmits the beacon to the RF transceiver.

In other features, a wireless network device in a wireless network that includes a plurality of wireless network devices comprises transmitting and receiving means for transmitting and receiving data packets and for periodically transmitting or receiving a beacon and control means for communicating with the transmitting and receiving means, for determining a group identifier and a station identifier based on the beacon, and for selecting one of a default IFS time and a second IFS time based on a data packet received.

In still other features, the control means selects one of the default IFS time and the second IFS time based on the data packet received and at least one of the group identifier and/or the station identifier. The second IFS time is less than or equal to the default IFS time. The control means determines a group identifier x and a station identifier y based on the beacon. The control means selects the second IFS time when the data packet is received from a second wireless network device having a group identifier x−1 and a station identifier y. The control means selects the second IFS time when the data packet is received from a second wireless network device having a group identifier less than x and a station identifier y. The control means selects the default IFS time when the data packet is received from a second wireless network device having a group identifier x and a station identifier other than y.

In still other features, a group IFS time is based on the group identifier, a delta IFS time is based on the station identifier, and the default IFS time is a sum of the group IFS time and the delta IFS time. The device transmits a data packet after one of the default IFS time or the second IFS time. The wireless network device further comprises power management means for transitioning the wireless network device between an active mode and an inactive mode. The power management means transitions the wireless network device to the active mode prior to a scheduled beacon time. The power management means transitions the wireless network device to the inactive mode after the device transmits the data packet.

In other features, a method for transmitting and receiving data with a first wireless network device in a wireless network that includes a plurality of wireless network devices comprises transmitting and receiving data packets, periodically transmitting or receiving a beacon, determining a group identifier and a station identifier based on the beacon, and selecting one of a default IFS time and a second IFS time based on a data packet received.

In still other features, the step of selecting includes selecting one of the default IFS time and the second IFS time based on the data packet received and at least one of the group identifier and/or the station identifier. The second IFS time is less than or equal to the default IFS time. A group identifier x and a station identifier y are determined based on the beacon. The step of selecting includes selecting the second IFS time when the data packet is received from a second wireless network device having a group identifier x−1 and a station identifier y. The step of selecting includes selecting the second IFS time when the data packet is received from a second wireless network device having a group identifier less than x and a station identifier y. The step of selecting includes selecting the default IFS time when the data packet is received from a second wireless network device having a group identifier x and a station identifier other than y.

In still other features, a group IFS time is based on the group identifier, a delta IFS time is based on the station identifier, and the default IFS time is a sum of the group IFS time and the delta IFS time. A data packet is transmitted after one of the default IFS time or the second IFS time. The first wireless network device is transitioned between an active mode and an inactive mode. The step of transitioning includes transitioning the first wireless network device to the active mode prior to a scheduled beacon time. The step of transitioning includes transitioning the wireless network device to the inactive mode after transmitting the data packet.

In other features, a computer program executed by a processor comprises transmitting and receiving data packets, periodically transmitting or receiving a beacon, determining a group identifier and a station identifier based on the beacon, and selecting one of a default IFS time and a second IFS time based on a data packet received.

In still other features, the step of selecting includes selecting one of the default IFS time and the second IFS time based on the data packet received and at least one of the group identifier and/or the station identifier. The second IFS time is less than or equal to the default IFS time. A group identifier x and a station identifier y are determined based on the beacon. The step of selecting includes selecting the second IFS time when the data packet is received from a wireless network device having a group identifier x−1 and a station identifier y.

In still other features, the step of selecting includes selecting the second IFS time when the data packet is received from a wireless network device having a group identifier less than x and a station identifier y. The step of selecting includes selecting the default IFS time when the data packet is received from a wireless network device having a group identifier x and a station identifier other than y. A group IFS time is based on the group identifier, a delta IFS time is based on the station identifier, and the default IFS time is a sum of the group IFS time and the delta IFS time. A data packet is transmitted after one of the default IFS time or the second IFS time.

In still other features, a wireless network device is transitioned between an active mode and an inactive mode. The step of transitioning includes transitioning the wireless network device to the active mode prior to a scheduled beacon time. The step of transitioning includes transitioning the wireless network device to the inactive mode after transmitting the data packet.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7A is a timing diagram that illustrates client station IFS times in a wireless LAN according to a first implementation of the present invention;

FIG. 7B is a timing diagram that illustrates client station IFS times in a wireless LAN according to a first implementation of the present invention;

FIG. 9A is a timing diagram that illustrates client station IFS times in a wireless LAN according to a second implementation of the present invention;

FIG. 9B is a timing diagram that illustrates client station IFS times in a wireless LAN according to a second implementation of the present invention;

FIG. 9C is a timing diagram that illustrates client station IFS times in a wireless LAN according to a second implementation of the present invention;

DETAILED DESCRIPTION OF THE PREFERRED EMBODIMENTS

Figure 1:
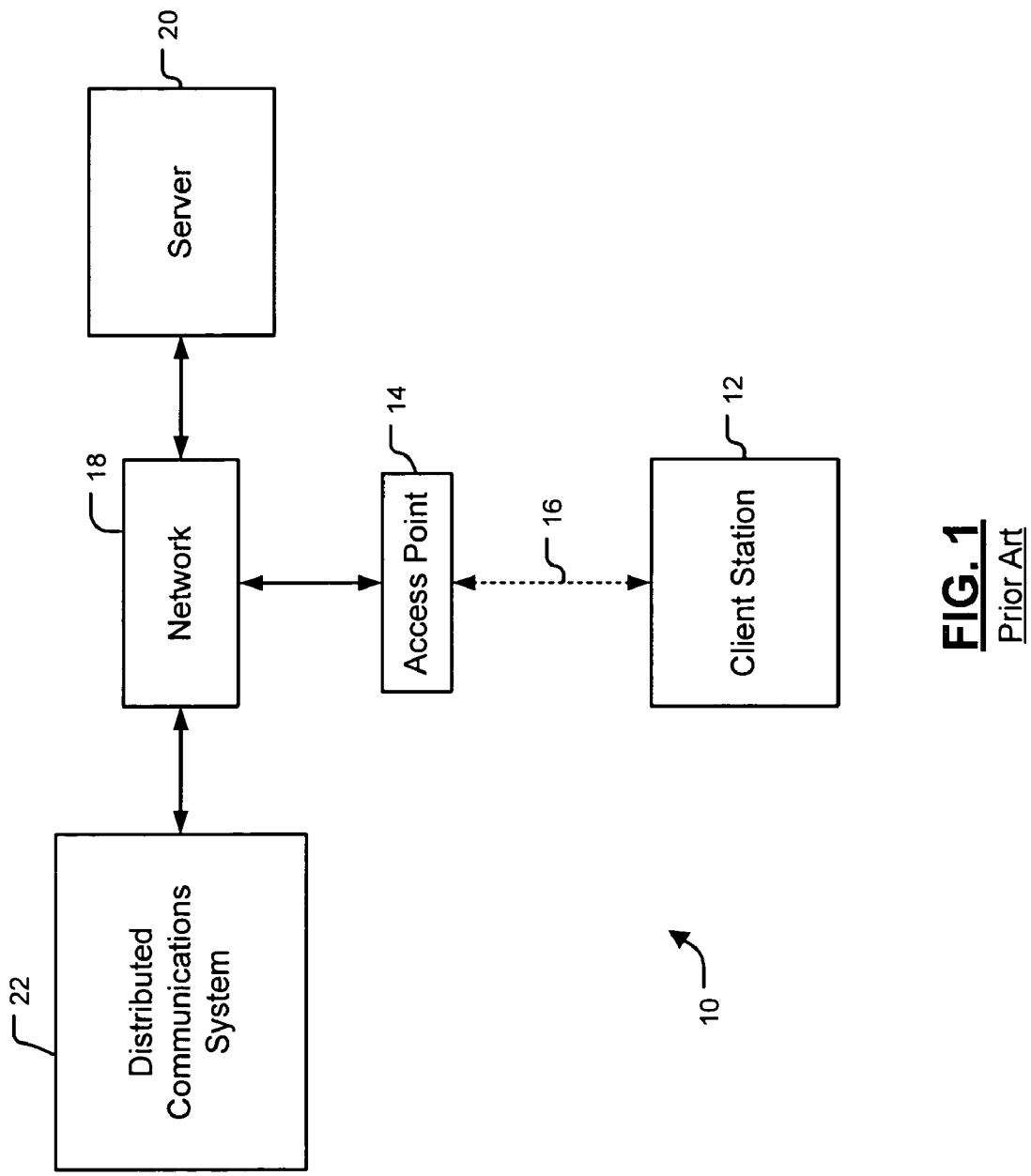
FIG. 1 is a functional block diagram of a wireless network that is configured in an infrastructure mode and that includes one or more client stations and an access point (AP) according to the prior art.
Figure 2:
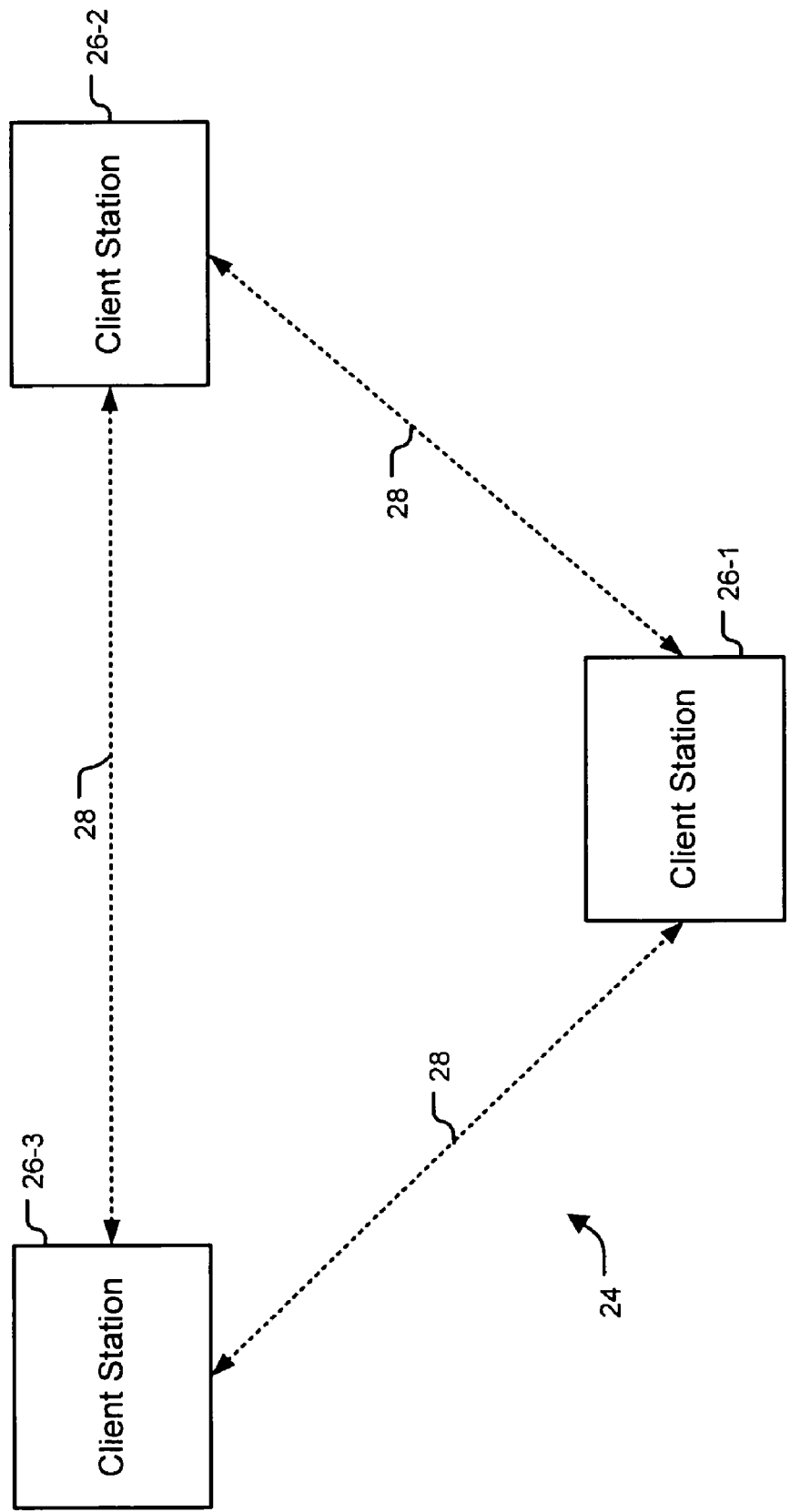
FIG. 2 is a functional block diagram of a wireless network that is configured in an ad-hoc mode and that includes multiple client stations according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

An inter-frame space (IFS) time is a minimum time that a station waits after the communication medium becomes free prior to transmitting data. To minimize power consumption, the wireless protocol according to the present invention allows stations to use shorter and/or constant IFS times with no random backoff periods. By preventing collisions while eliminating the need for random backoff periods and by maintaining short IFS times for every station, the average awake time and the power consumption of all of the stations is reduced. A wireless network operating in either an infrastructure mode or an ad hoc mode may implement the wireless protocol as described herein.

In some types of networks, most or all of the stations need to transmit data regularly, for example, at each beacon interval. One example of this type of network is a wireless console gaming application. Since most or all of the stations transmit frames to one or more other stations during each beacon interval, a master station determines a station access sequence after each beacon transmission. The master station can vary the station access sequence by randomizing or rotating the order following each beacon transmission. The IFS time for each station is dependent partly upon the access sequence and partly upon frames previously received in a particular beacon period. In this manner, a given client station will transmit data according to a first IFS time during a first beacon interval, and according to a second or different IFS time during a second beacon interval.

In a wireless gaming network operating in the infrastructure or ad hoc mode, all client stations transmit frames to every other client station during each beacon interval. The IFS times of each client station dictate a client access sequence for a given beacon interval. The client station access sequence is varied by randomizing or rotating the IFS times among the client stations following each beacon transmission. In this manner, a given client station will transmit data according to a first IFS time during a first beacon interval, and according to a second IFS time during a second beacon interval.

Figure 3:
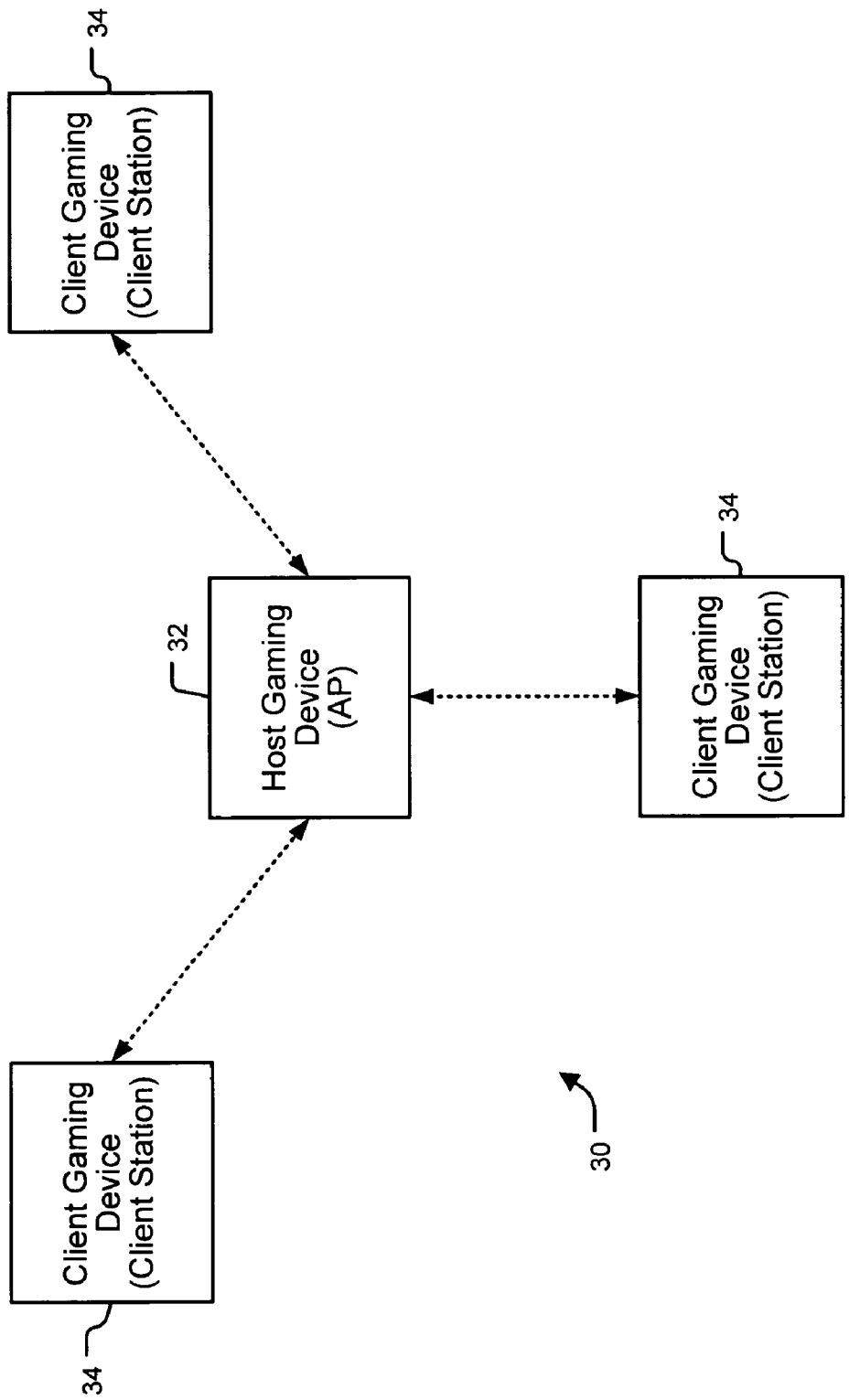
FIG. 3 is a functional block diagram of a wireless gaming network that is configured in an infrastructure mode wireless local area network (LAN) according to the present invention.

Referring now to FIG. 3, a wireless gaming network 30 includes a host gaming device 32 and one or more client gaming devices 34. The client gaming devices 34 include wireless local area network (WLAN) hardware and operate as client stations in an infrastructure mode network. The host gaming device 32 also includes wireless LAN hardware and operates as an access point (AP) in the wireless gaming network. The wireless gaming network allows for greater mobility of the client gaming devices 34 and conserves operating power by reducing the overall duration of the active mode. Those skilled in the art can appreciate that the host gaming device 32 and the client gaming devices 34 may be a game console and wireless input devices, respectively, or any other suitable implementation of an AP and one or more wireless client stations. Alternatively, the wireless gaming network 30 excludes the host gaming device 32 and operates in an ad hoc mode.

Figure 4:
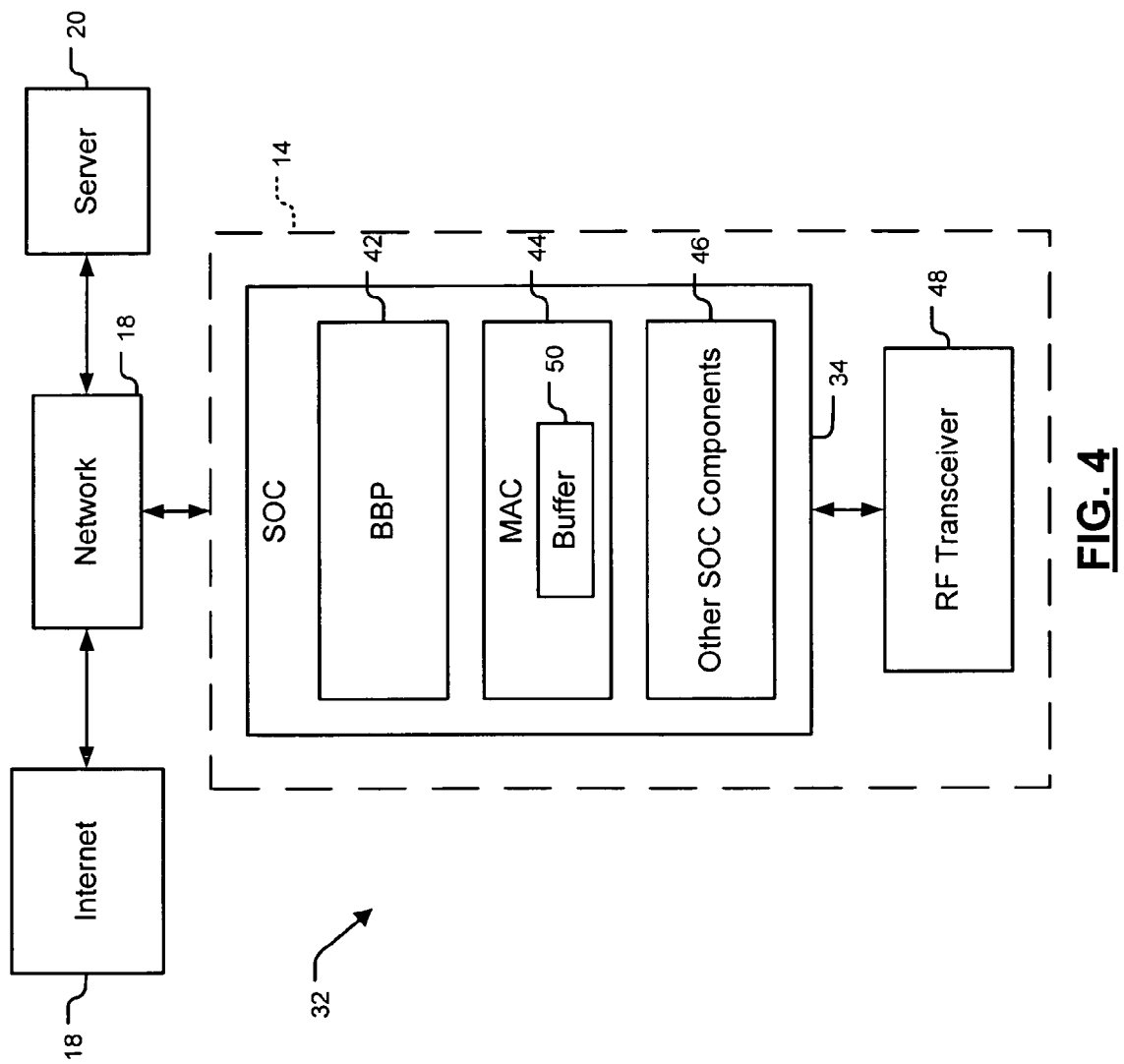
FIG. 4 is a functional block diagram of an AP for a console in a wireless gaming network that includes an SOC and a radio frequency (RF) transceiver according to the present invention.

Referring now to FIG. 4, an exemplary AP 14 for a host gaming device 32 includes a system on chip (SOC) 34. The SOC 34 includes a baseband processor (BBP) 42, a media access control (MAC) device 44, and other SOC components, identified collectively at 46, including interfaces, memory, and/or processors. A radio frequency (RF) transceiver 48 along with the BBP 42 communicates with the MAC device 44. The RF transceiver 48 transmits/receives data to/from client stations in the wireless LAN. Since the AP 14 may have data that is intended for the client stations during the low power mode, the MAC device 44 includes a buffer 50. The MAC device 44 stores data that is intended for the client stations in the buffer 50 until the client stations enter the active mode. As illustrated in FIG. 1, the AP 14 may be a node in a network 18 that includes other nodes such as a server 20 and may be connected to a distributed communications system 22 such as the Internet.

Figure 5:
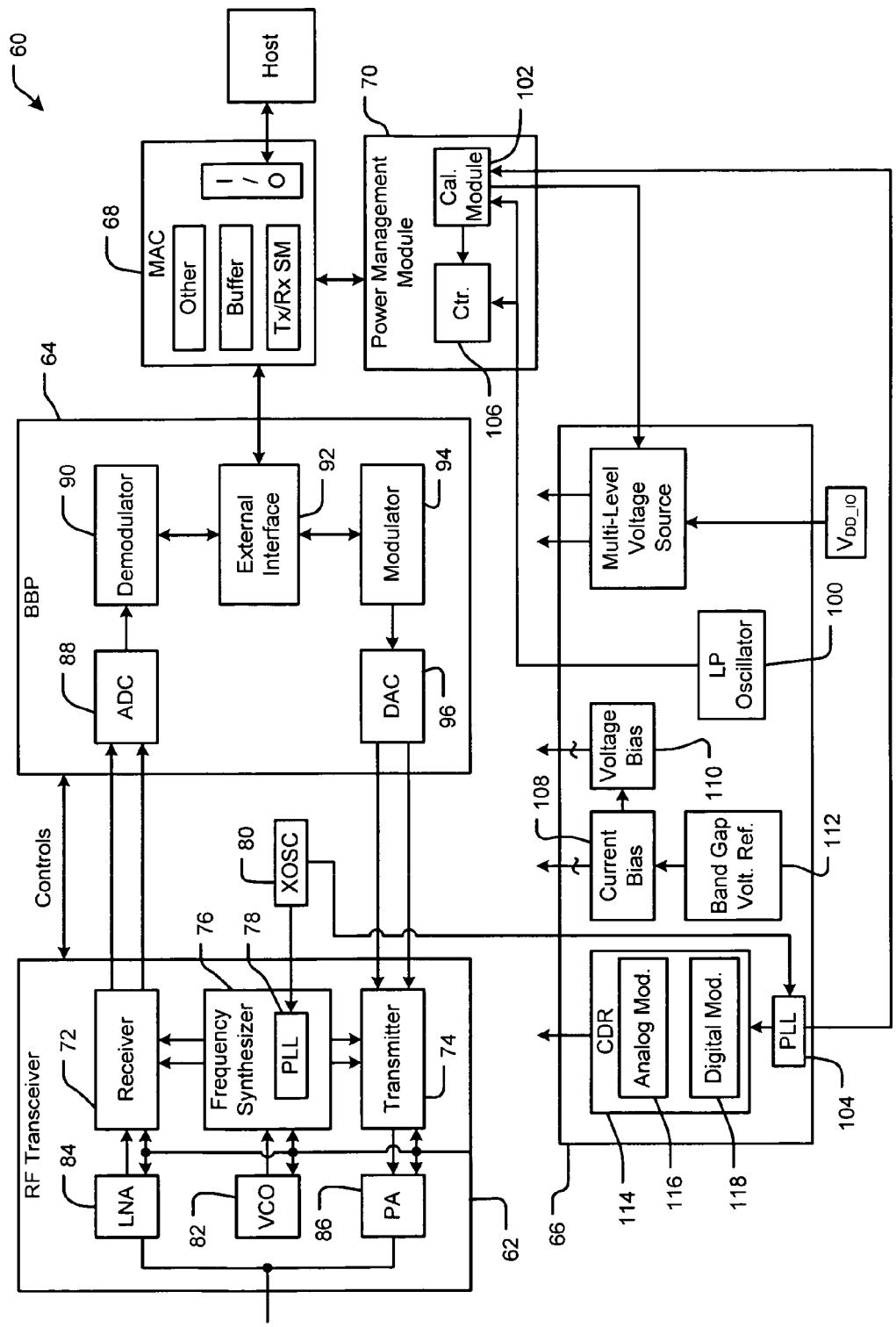
FIG. 5 is a functional block diagram of a wireless network device according to the present invention.

Each client gaming device 34 includes an exemplary wireless network device 60 as shown in FIG. 5. The wireless network device 60 according to some implementations of the present invention is shown to include an RF transceiver module 62, a baseband processor module 64, a power and clock module 66, a MAC module 68, and a power management module 70. The RF transceiver 62 includes a receiver 72 and a transmitter 74. While not shown, the network device 60 can also include a processor and other standard components.

A frequency synthesizer 76 includes a phase locked loop (PLL) 78 that receives a first reference frequency from an oscillator such as a crystal oscillator 80. The frequency synthesizer 76 also contains a voltage controlled oscillator (VCO) 82, which provides an adjustable frequency output based on an input signal thereto. The frequency synthesizer 76 generates RF and IF output signals for the receiver and transmitter 72 and 74, respectively.

During receiver operation, an input of a low noise amplifier (LNA) 84 receives signals from an antenna (not shown), amplifies the signals and outputs them to the receiver 72. During transmitter operation, an output of the transmitter 74 is received by a power amplifier (PA) 86, which outputs amplified signals to the antenna.

On the receiver side, the BBP 64 includes an analog to digital converter (ADC) 88 that receives signals from the receiver 72. The ADC 88 communicates with a demodulator 90, which demodulates the signals. An output of the demodulator 90 communicates with an external interface 92, which communicates with the MAC 68. On the transmitter side, the MAC 68 sends signals to the external interface 92, which are modulated by a modulator 94 and output to a digital to analog converter (DAC) 96. The DAC 96 outputs signals to the transmitter 74. The BBP 64 also may include a PLL (not shown). Alternatively, the ADC 88 and the DAC 96 may be located on the RF transceiver 62.

The power and clock module 66 includes a multi-level voltage source 98 that receives an input voltage such as VDD and a mode signal and outputs two or more voltage levels. The power and clock module 66 also includes a low power (LP) oscillator 100. The power management module 70 along with the MAC module 68 and processor (not shown) selects an operating mode of the wireless network device 60. The operating modes include active and inactive (i.e. low power) modes, although additional modes may be provided. The power management module 70 may also be located in the MAC module 68 or the power and clock module 66.

An optional calibration module 102 that is associated with the power management module 70 is optionally used to calibrate the duration of the inactive mode. The calibration module 102 receives an output of the LP oscillator 100 and a PLL 104 and calibrates a value of a counter 106 that is used to calculate the duration of the inactive mode. The calibration can be performed periodically, on an event basis, randomly, before transitioning to the inactive mode and/or on any other suitable basis. Alternatively, the calibration module 102 may be omitted from the wireless network device 60.

The power and clock module 66 further includes current and voltage bias circuits 108 and 110, respectively, that provide current and/or voltage biases to various circuits and/or modules (connections not shown) in the wireless network device 60. The current bias circuit 108 may include one or more off-chip calibration resistors (not shown) and the voltage bias circuit may include one or more on-chip resistors (not shown). A band gap voltage reference 112 may be used to bias the current bias circuit 108.

A clock data recovery (CDR) module 114 performs clock recovery and includes analog and digital modules 116 and 118, respectively, or only digital modules. An output of the phase lock loop (PLL) 104 is coupled to the CDR module 114.

Figure 6:
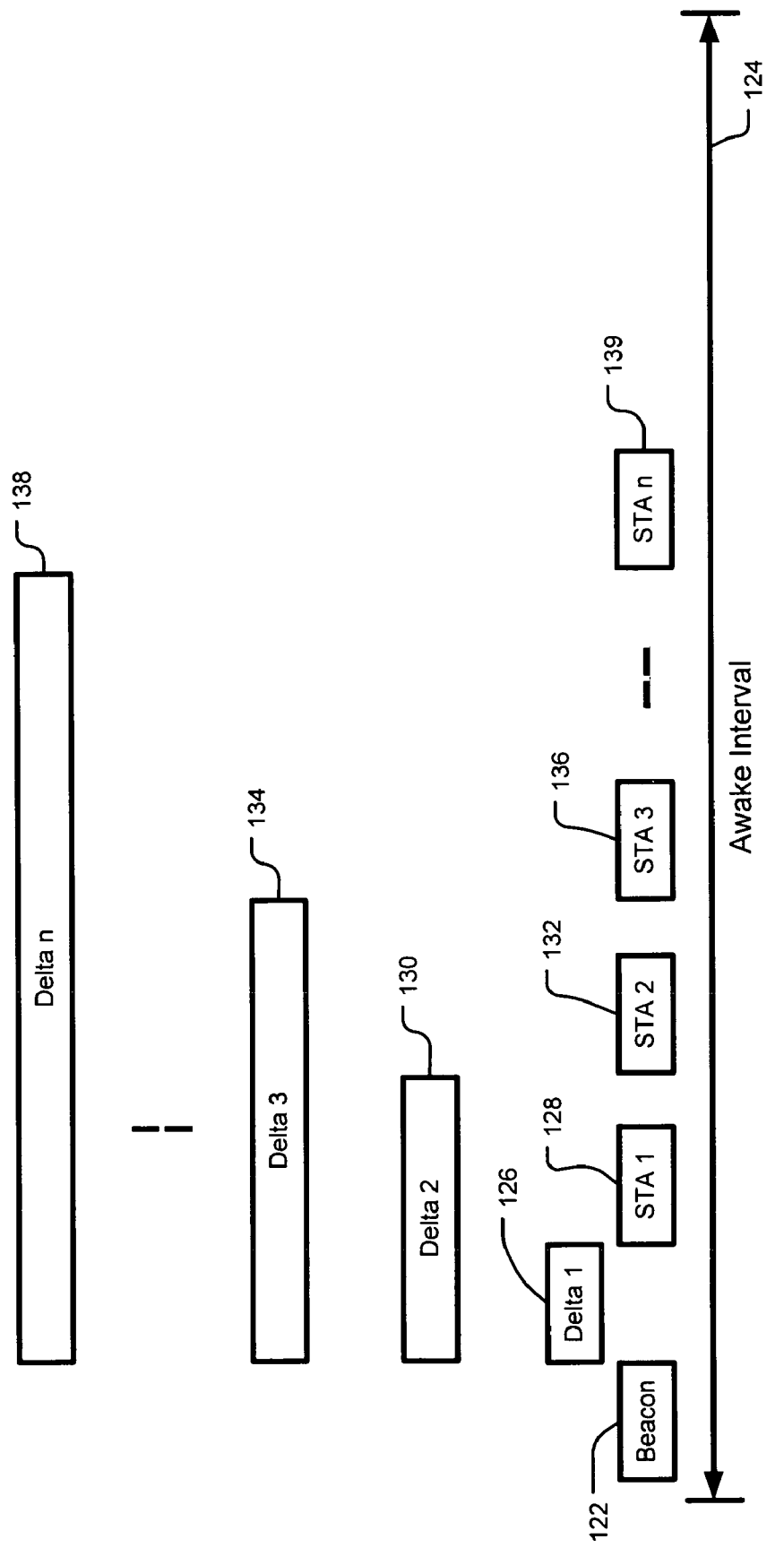
FIG. 6 is a timing diagram that illustrates client station TDM protocol delta times in a wireless LAN according to the prior art.

Referring to now FIG. 6, an exemplary TDM timing diagram 120 according to the prior art is illustrated. One or more client stations enter the active mode prior to the transmission of a beacon signal 122. In a wireless network operating in the infrastructure mode, the AP transmits the beacon signal 122. In the ad hoc mode, however, one of the client stations transmits the beacon signal. The client stations attempt to transmit data according to assigned delay times following the reception of the beacon and during an awake interval 124 that is defined by the beacon signal 122.

Delay, or delta, times for each client station can be varied each beacon interval. For example, the default delay times may be carried in the beacon signal 122. As a result, the station access sequence for the client stations varies with each beacon interval. The client stations wait the delay time after the transmission medium becomes free before transmitting data. When transmission of a data frame or packet over the medium is complete, the device that receives the data packet may transmit an acknowledgment data packet if the destination of the packet is a single receiver.

A first client station waits a first delta time 1 as illustrated at 126. Second, third, and nth client stations begin waiting second, third, ..., and nth delta times, respectively. Since the delta time 1 is the shortest, it terminates first. The first client station transmits a data packet as illustrated at 128. While the first client station transmits a data packet at 128, the remaining client stations are still waiting for their corresponding delta times. In other words, the transmission of the first client station at 128 occurs while the remaining client stations are still waiting for their respective delta times to expire. Therefore, the second client station waits the second delta time 2 (the next shortest delta time) as illustrated at 130. The second client station then transmits a data packet as illustrated at 132. The third client station waits the third delta time 3 as illustrated at 134, and then transmits a data packet as illustrated at 136. The nth client station waits the nth delta time n as illustrated at 138, and then transmits a data packet as illustrated at 139.

In subsequent beacon intervals (not shown), the delta times of each station can be varied. For example, the nth client station may operate according to the first delta time 1, and the first client station may operate according to the third delta time 3. Similarly, the delta times of the remaining client stations are varied. Those skilled in the art can appreciate that the delta times, and therefore the station access sequence, may be varied sequentially, randomly, or in any other suitable manner.

The client stations transition to the low power mode after all client stations complete transmission as illustrated by the termination of the awake interval 124. For example, in a wireless gaming network operating in the infrastructure or ad hoc mode, each client station remains awake in order to receive all data packets from other client stations in the network.

Alternatively, each client station transitions to the low power mode immediately after transmitting a data packet. For example, in a wireless gaming console operating in the infrastructure mode, wireless input devices operating as client stations may transition to the low power mode immediately after transmitting data to the console (AP). Since the station access sequence varies following each beacon interval, the first, second, third, and nth client stations consume approximately the same average power over time.

Referring now to FIGS. 7A through 7D, a timing diagram 140 illustrates a first implementation of the present invention. Each client station is assigned a default unique IFS time 1, 2, 3, ..., n as opposed to the unique delta times described with respect to FIG. 6. The unique IFS times cause the stations to transmit in the order of ascending IFS, similar to the effect of the delta times described in FIG. 6. However, the IFS times measure a time since the transmission media becomes free rather than a fixed time since the beacon transmission 122. In this manner, each client station waits a unique IFS time after the beacon transmission 122 and/or after a previous client station completes transmission.

The client stations follow one or more rules during each beacon interval to determine whether to wait the assigned default IFS time or a shorter alternative IFS time. In one implementation, if a client station receives an expected number of data packets of a particular type (i.e. all preceding client stations have transmitted), then that client station waits the alternative IFS time. In typical wireless gaming applications, each client station has a single data packet to transmit to all other client stations. However, a client station may have more than one data packet type to transmit during a beacon interval. For example, a client gaming device may transmit a control data packet to a host gaming device, and then transmit a gaming data packet to all other client gaming devices. Therefore, subsequent client gaming devices would expect to receive the gaming data packet, but not the control data packet.

Referring now to FIG. 7A, if a given client station receives data packets from all previously transmitting client stations, the client station waits the IFS time 1. The IFS time 1 is the default IFS time of the first client station as illustrated at 142. The first client station waits the first IFS time 1 and transmits a data packet as illustrated at 144. The second client station is second in the station access sequence according to the IFS time 2, and therefore only expects to receive the data packet from the first client station (i.e. one data packet of an expected type) prior to transmitting. If the second client station receives the data packet from the first client station, the second client station waits the IFS time 1 as illustrated at 146, and transmits a data packet as illustrated at 148.

In other words, because the first client station already transmitted data during this beacon interval, there is no danger that collision will occur between the first client station and the second client station at IFS time 1. The third client station is third in the station access sequence, and therefore expects to receive two data packets prior to transmitting. If the third client station receives the data packets from the first and second client stations, the third client station waits the IFS time 1 as illustrated at 150 and transmits a data packet as illustrated at 152. The nth client station operates analogously and waits the IFS time 1 as illustrated at 154 before transmitting a data packet as illustrated at 156. In subsequent beacon intervals, the IFS times are varied as described above, but the clients stations continue to follow the one or more rules for alternative IFS times.

In this manner, data is exchanged between all client stations more quickly, and the overall awake time of the client stations is reduced, minimizing power consumption. Additionally, since the percentage of time required for all stations to transmit their data is reduced, there is a greater likelihood that all stations will be able to transmit each beacon interval when competing for the medium with other WLAN networks. As described above and in FIG. 7A, the awake interval 124 is significantly reduced if most or all client stations transmit and receive properly.

Referring now to FIG. 7B, the timing diagram 140 illustrates operation of the client stations when one client station does not receive a data packet from a preceding client station. The first client station transmits a data packet after IFS time 1 as illustrated at 158. However, the second client station does not properly receive the data packet from the first client station. For example, the second client station may not receive the data packet due to noise or other network problems. Therefore, the second client station waits the IFS time 2 as illustrated at 160 prior to transmitting a data packet as illustrated at 162. The third and nth client stations properly receive all preceding data packets and wait the IFS time 1 prior to transmitting as illustrated at 164 and 166, respectively.

Figure 7C:
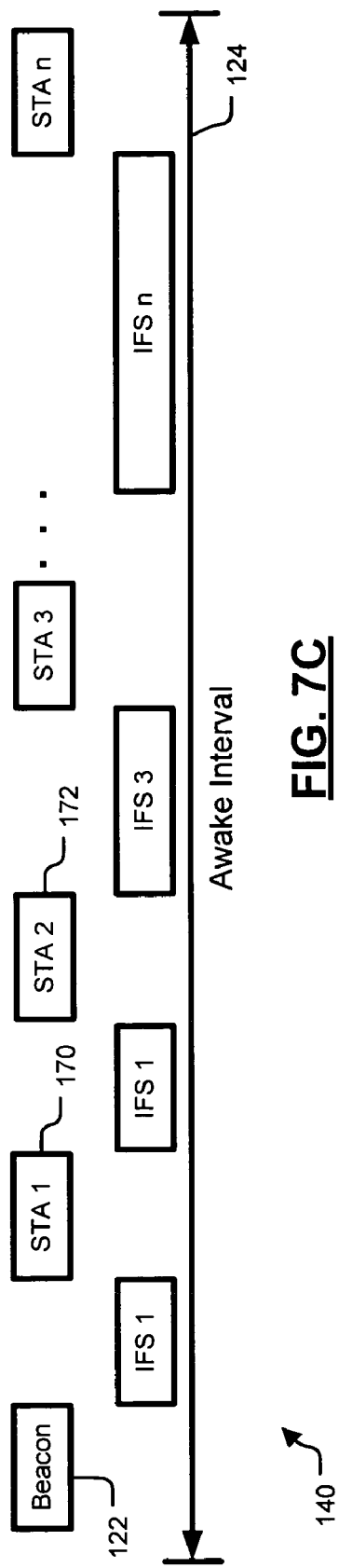
FIG. 7C is a timing diagram that illustrates client station IFS times in a wireless LAN according to a first implementation of the present invention.

Referring now to FIG. 7C, the timing diagram 140 illustrates operation of the client stations when client stations 3 and above do not receive a data packet from a preceding client station. The first client station transmits a data packet after the IFS time 1 as illustrated at 170. The second client station receives the data packet and transmits after the IFS time 1 as illustrated at 172. The third and nth client stations do not receive the data packet from the second client station. For example, noise may corrupt the transmission from the second client station. Therefore, the third and nth client stations are not able to use IFS time 1, and use the default IFS times 3, and n, respectively.

Figure 7D:
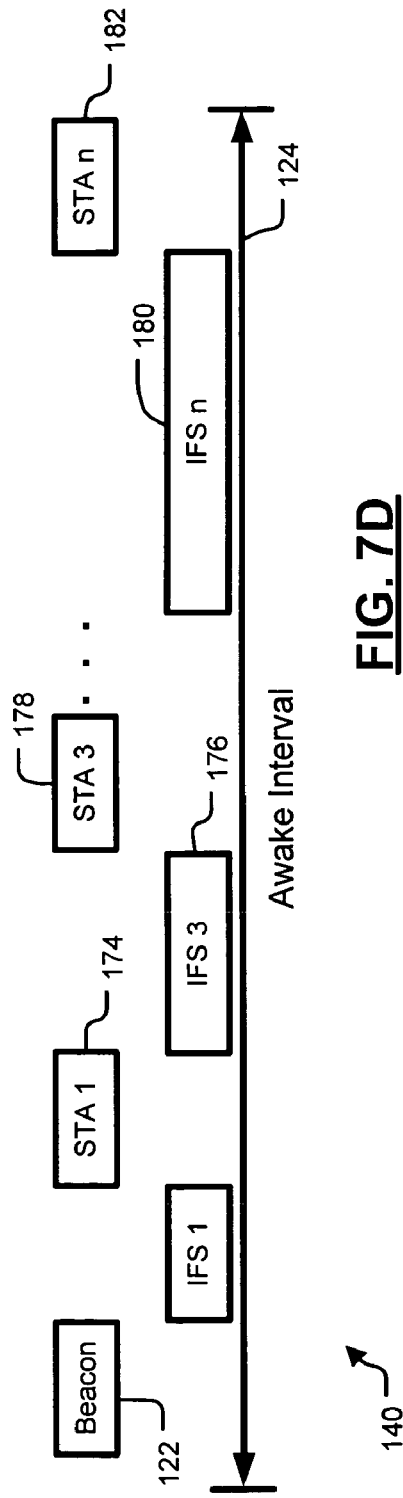
FIG. 7D is a timing diagram that illustrates client station IFS times in a wireless LAN according to a first implementation of the present invention.

Alternatively, the second client station may be absent from the network and/or fail to transmit altogether as shown in FIG. 7D. The first client station transmits a data packet after the IFS time 1 as illustrated at 174. The second client station does not transmit a data packet. Therefore, the third client station waits the default IFS time 3 after the first client station completes transmission as illustrated at 176. The third client station transmits a data packet after the IFS time 3 as illustrated at 178. Similarly, the nth client station waits the default IFS time n after an (n−1)th client station completes transmission as illustrated at 180, and then transmits a data packet as illustrated at 182.

Figure 8:
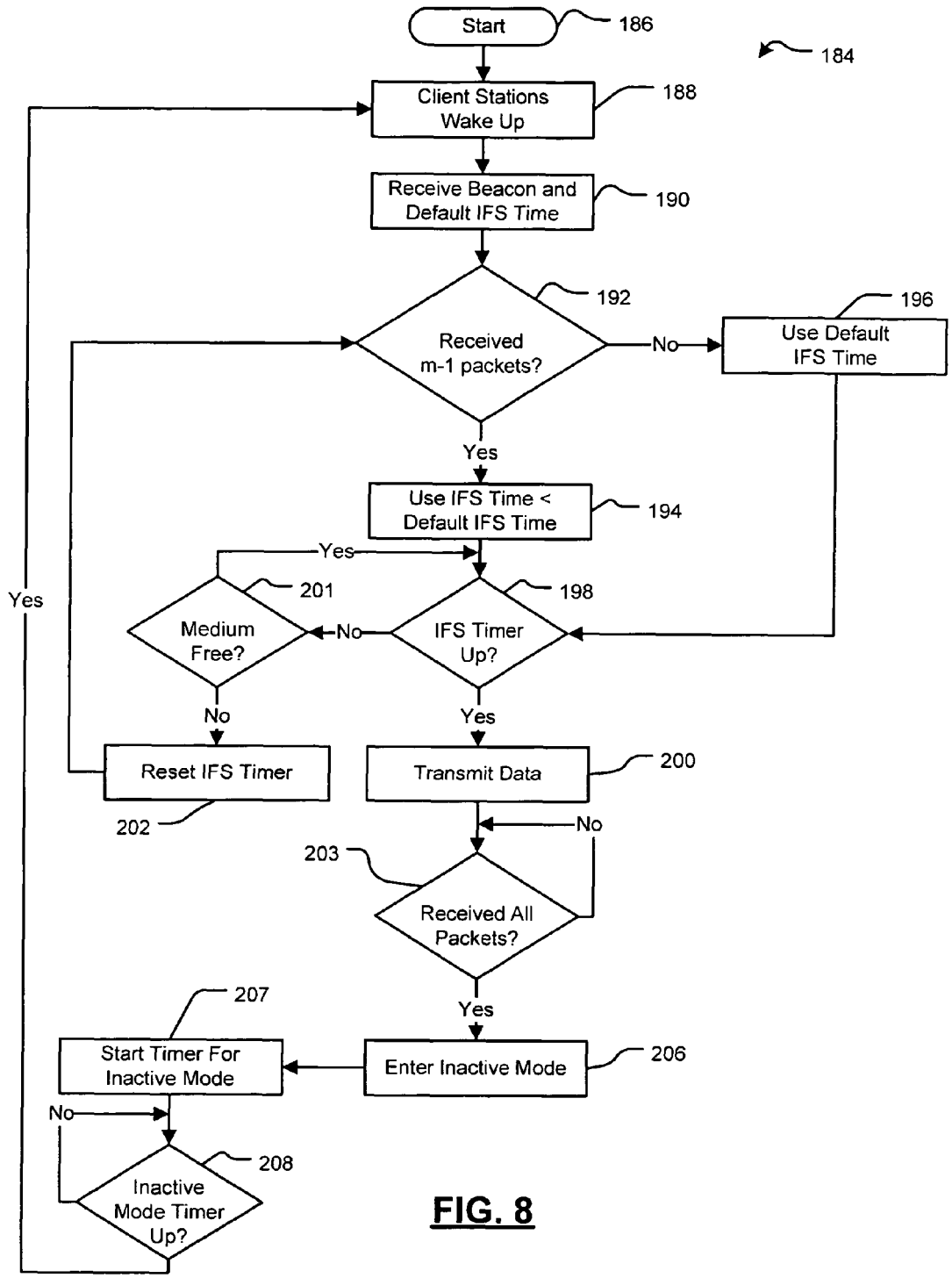
FIG. 8 is a flowchart that illustrates steps performed by a wireless network device to select client station IFS times according to a first implementation of the present invention.

Referring now to FIG. 8, a first IFS time selection method 184 begins in step 186. In step 188, the client stations enter the active mode prior to receiving a beacon transmission. In step 190, the client stations receive the beacon signal. The beacon signal includes data that determines the default IFS times of the client stations. In the present implementation, the beacon signal may also indicate a slot m within the station access sequence for each client station. Alternatively, the beacon signal may include a single value that indicates both the default IFS time and the slot m of each client station. For example, the beacon signal may include a timer synchronization function (TSF) value that indicates the default IFS time and/or the slot m of the client station. In step 192, a client station determines whether it received m−1 data packets of the correct type. If true, the method 184 continues to step 194. If false, the method 184 continues to step 196. In step 194, the client station waits an alternative IFS time that is less than or equal to the default IFS time. In step 196, the client station waits the default IFS time.

In step 198, the client station determines whether the IFS time of step 194 or step 196 is up. If true, the method 184 continues to step 200. If false, the method 184 continues to step 201. In step 201, the client station determines whether the transmission medium is free. If true, the method 184 returns to step 198. If false, the method 184 continues to step 202. In step 202, the client station resets the IFS timer, and the method 184 returns to step 192. In other words, the client station continues to wait the IFS time for as long as the transmission medium is free. If the client station detects activity on the transmission medium, the IFS timer resets.

In step 200, the client station transmits a data packet. In step 203, the method 184 determines whether the client station has received data packets from all the other client stations in the wireless network, and/or whether the beacon interval will expire soon. If true, the method 184 continues to step 206. If false, the method 184 returns to step 203 until all packets are received. In other words, if all stations have completed transmission and/or the beacon interval is to expire soon, the method 184 continues to step 206. Otherwise, the method 184 returns to step 203 and the station waits while each client station attempts to transmit in this manner. In step 206, the client station enters the inactive mode. In step 207, the method 184 starts an inactive mode timer. In step 208, the method 184 determines whether the inactive mode timer is up. If true, the method 184 repeats for subsequent beacon intervals and returns to step 188. If false, the method 184 returns to step 208.

Referring now to FIGS. 9A through 9C, the timing diagram 210 illustrates a second implementation of the present invention. If a client station receives a data packet of a particular type from the immediately preceding client station, the client station waits an alternative IFS time before transmitting data. If the client station does not receive the particular data packet from the immediately preceding client station, the client station waits the default IFS time before transmitting data. In the present implementation, each client station in the network maintains a table of MAC addresses for all other client stations in the network. In other words, each client station is able to identify the data packet received from an immediately preceding client station based on its MAC address. Additionally, each data packet includes information that identifies its order in the station access sequence. In this manner, a receiving client station is able to determine if a particular data packet was transmitted by the immediately preceding client station.

If a given client station receives the data packet from the immediately preceding client station, the client station waits the IFS time 1. If all client stations receive the data packet from the corresponding immediately preceding client station, all client stations wait the IFS time 1 as shown previously in FIG. 7A. Referring now to FIG. 9A, the timing diagram 210 illustrates operation of the client stations when one client station does not receive a data packet from an immediately preceding client station. The first client station transmits a data packet after IFS time 1 as illustrated at 212. However, the second client station does not properly receive the data packet from the first client station. Therefore, the second client station waits the IFS time 2 prior to transmitting a data packet as illustrated at 214. The third client station properly receives the data packet from the second client station, and the nth client station properly receives the data packet from an (n−1)th station. Therefore, the third client station and the nth client station wait the IFS time 1 before transmitting data.

Referring now to FIG. 9B, the timing diagram 210 illustrates operation of the client stations when all subsequent client stations do not receive a data packet from a preceding client station. The first client station transmits a data packet after IFS time 1 as illustrated at 216. The second, third, and nth client stations do not receive the data packet from the first client station. The second client station waits the IFS time 2 prior to transmitting a data packet as illustrated at 218. However, according to the present implementation, the third and nth client stations do not need to receive the data packet from the first client station in order to use the IFS time 1. If the third client station properly receives the data packet from the second client station, the third client station uses IFS time 1. Likewise, if the nth client station receives the data packet from the (n−1)th client station, the nth client station uses IFS time 1.

Referring now to FIG. 9C, the timing diagram 210 illustrates operation of the client stations when one client station stops transmitting or disconnects from the wireless network. The first client station transmits a data packet after IFS time 1 as illustrated at 220. The second client station does not transmit. Therefore, the third client station transmits a data packet after waiting the IFS time 3 as illustrated at 222. If the nth client station properly receives the data packet from the (n−1)th client station, the nth client station uses IFS time 1.

As described above in FIGS. 9A through 9C, subsequent client stations will use the alternative IFS time if the immediately preceding client station transmitted a particular data packet. However, in certain situations, collision may occur. For example, if the first client station is not able to transmit a data packet, the second client station will transmit a data packet after IFS time 2. After the second client station transmits the data packet, the third client station will attempt to transmit a data packet after IFS time 1. However, the first client station will wait until the second client station completes transmission, and also attempt to transmit a data packet after IFS time 1, resulting in collision. Therefore, although the implementation described in FIGS. 9A through 9C provides significant improvement in a noise-free environment, it can be seen that operation in certain environments is undesirable.

Figure 10:
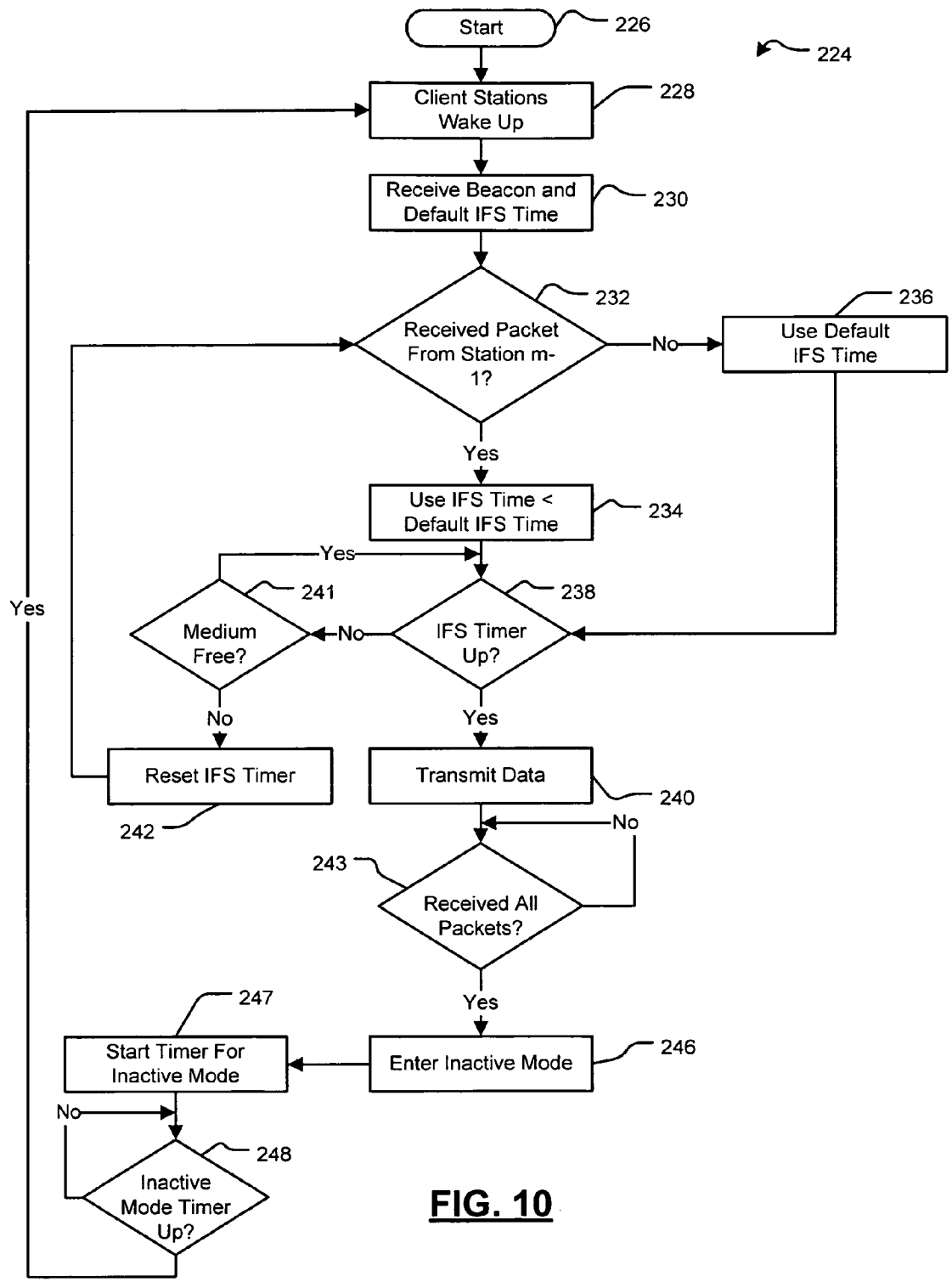
FIG. 10 is a flowchart that illustrates steps performed by a wireless network device to select client station IFS times according to a second implementation of the present invention.

Referring now to FIG. 10, a second IFS time selection method 224 begins in step 226. In step 228, the client stations transition to the active mode prior to receiving a beacon transmission. In step 230, the client stations receive the beacon signal. The beacon signal includes data that determines the default IFS times of the client stations, which determines the slot in the station access sequence for each client station. In step 232, a client station determines whether it received a data packet from the client station in slot m−1. If true, the method 224 continues to step 234. If false, the method 224 continues to step 236. In step 234, the client station waits an alternative IFS time that is shorter than the default IFS time. In step 236, the client station waits the default IFS time.

In step 238, the client station determines whether the IFS time of step 234 or step 236 is up. If true, the method 224 continues to step 240. If false, the method 224 continues to step 241. In step 241, the client station determines whether the transmission medium is free. If true, the method 224 returns to step 238. If false, the method 224 continues to step 242. In step 242, the client station resets the IFS timer, and the method 224 returns to step 232.

In step 240, the client station transmits a data packet. In step 243, the method 224 determines whether the client station has received data packets from all other client stations in the wireless network, and/or whether the beacon interval will expire soon. If true, the method 224 continues to step 246. If false, the method 224 returns to step 243 until all packets are received. In other words, if all stations have completed transmission and/or the beacon interval is to expire soon, the method 224 continues to step 246. Otherwise, the method 224 returns to step 243 and the station waits while each client attempts to transmit in this manner. In step 246, the client station enters the inactive mode. In step 247, the method 224 starts an inactive mode timer. In step 248, the method 224 determines if the inactive mode timer is up. If true, the method 224 repeats for subsequent beacon intervals and returns to step 228. If false, the method 224 returns to step 248.

Referring now to FIGS. 11A through 11D, the timing diagram 250 illustrates a third implementation of the present invention. The client stations are divided into two or more groups, and each client station within a group is assigned a default IFS time. In one implementation, the default IFS time for a particular client station is equal to a group IFS time plus an incremental delta time to determine station access sequence. Each group is assigned an IFS group number that determines a group IFS time IFSG1, IFSG2, IFSG3, . . . , IFSGx. Each client station in a particular group is assigned an IFS station number that determines an incremental delta time $\Delta 1, \Delta 2, \Delta 3, \ldots, \Delta q$. Therefore, each client station is associated with an IFS group number and an IFS station number.

If a client station properly receives a data packet from a corresponding client station of an immediately preceding group, the client station uses the smallest IFS time of a corresponding client station from which the client station has properly received a data packet. In other words, if the client station is associated with IFS station 1, the client station uses the smallest IFS time of any preceding IFS station 1.

Figure 11A:
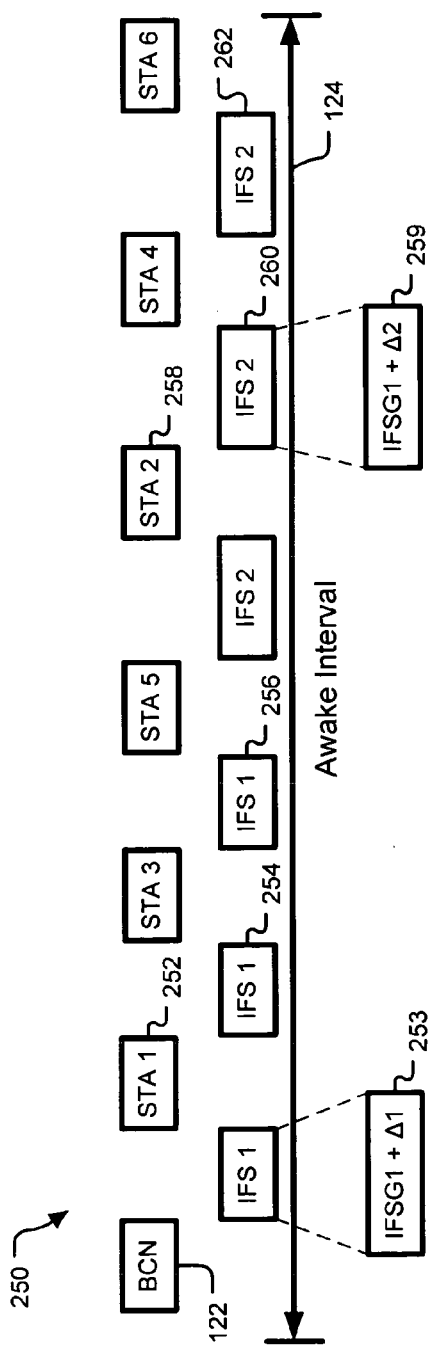
FIG. 11A is a timing diagram that illustrates client station IFS times in a wireless LAN according to a third implementation of the present invention.

Referring to FIG. 11A, first and second client stations are stations 1 and 2 of a first group and have default IFS times 1 and 2, respectively. The IFS time 1 is equivalent to a group IFS time IFSG1 plus an incremental delta time $\Delta 1$, and the IFS time 2 is equivalent to the group IFS time IFSG1 plus an incremental delta time $\Delta 2$. Third and fourth client stations are stations 1 and 2 of a second group and have default IFS times 3 and 4, respectively. The IFS time 3 is equivalent to a group IFS time IFSG2 plus the incremental delta time $\Delta 1$, and the IFS time 4 is equivalent to the group IFS time IFSG2 plus the incremental delta time $\Delta 2$. Fifth and sixth client stations are stations 1 and 2 of a third group and have default IFS times 5 and 6, respectively. The IFS time 5 is equivalent to a group IFS time IFSG3 plus the incremental delta time $\Delta 1$, and the IFS time 6 is equivalent to the group IFS time IFSG3 plus the incremental delta time $\Delta 2$.

Each successive group IFS time is greater than the preceding group IFS time plus an incremental delta time $\Delta q$. For example, the group IFS time IFSG2 is greater than the group IFS time IFSG1 time plus an incremental delta time $\Delta q$. Similarly, the group IFS time IFSG3 is greater than the group IFS time IFSG2 plus the incremental delta time $\Delta q$. In this manner, the client stations in subsequent groups have longer default IFS times than the client stations of preceding groups. Therefore, collisions between client stations of different groups is avoided.

The first client station transmits a data packet after the IFS time 1 as illustrated at 252. As described above, the IFS time 1 is equivalent to the group IFS time IFSG1 plus the incremental delta time $\Delta 1$ as illustrated at 253. The first, third, and fifth client stations are all associated with IFS station number 1. Therefore, if the third client station receives the data packet from the first client station, the third client station reuses the IFS time 1 of the first client station as illustrated at 254. If the fifth client station receives the data packets from the first and third client stations, the fifth client station reuses either the IFS time 1 or the IFS time 3, whichever is smaller. In the present example, the fifth client station reuses the IFS time 1 as illustrated at 256. The second client station transmits a data packet after the IFS time 2 as illustrated at 258. The IFS time 2 is equivalent to the group IFS time IFSG1 plus the incremental delta time $\Delta 2$ as illustrated at 259. The fourth client station receives the data packet from the second client station and reuses the IFS time 2 of the second client station as illustrated at 260. The sixth client station receives the data packets from the second and fourth client stations, and therefore reuses the IFS time 2 or the IFS time 4. In the present example, the sixth client station reuses the IFS time 2 as illustrated at 262.

Figure 11B:
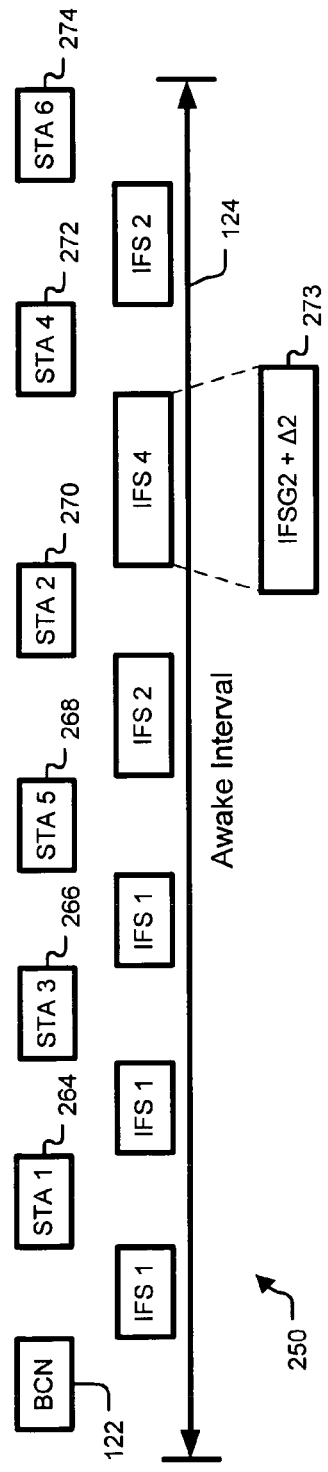
FIG. 11B is a timing diagram that illustrates client station IFS times in a wireless LAN according to a third implementation of the present invention.

Referring now to FIG. 11B, the timing diagram 250 illustrates the operation of the client stations in the event that a client station does not properly receive a data packet from a corresponding client station in a preceding group. The first client station transmits a data packet after the IFS time 1 as illustrated at 264. The third client station receives the data packet from the first client station and transmits a data packet after the IFS time 1 as illustrated at 266. The fifth client station receives the data packets from the first and third client stations and transmits a data packet after the IFS time 1 as illustrated at 268. The second client station transmits a data packet after the IFS time 2 as illustrated at 270. The fourth client station does not properly receive the data packet from the second client station. Therefore, the fourth client station is not able to reuse the IFS time 2 of the second client station, and transmits a data packet after the IFS time 4 as illustrated at 272. The IFS time 4 is equivalent to the group IFS time IFSG2 plus the incremental delta time $\Delta 2$ as illustrated at 273. The sixth client station receives the data packets from the second client station and the fourth client station. The sixth client station is able to reuse either the IFS time 2 or the IFS time 4, whichever is smaller. Therefore, the sixth client station reuses the IFS time 2 as illustrated at 274.

Figure 11C:
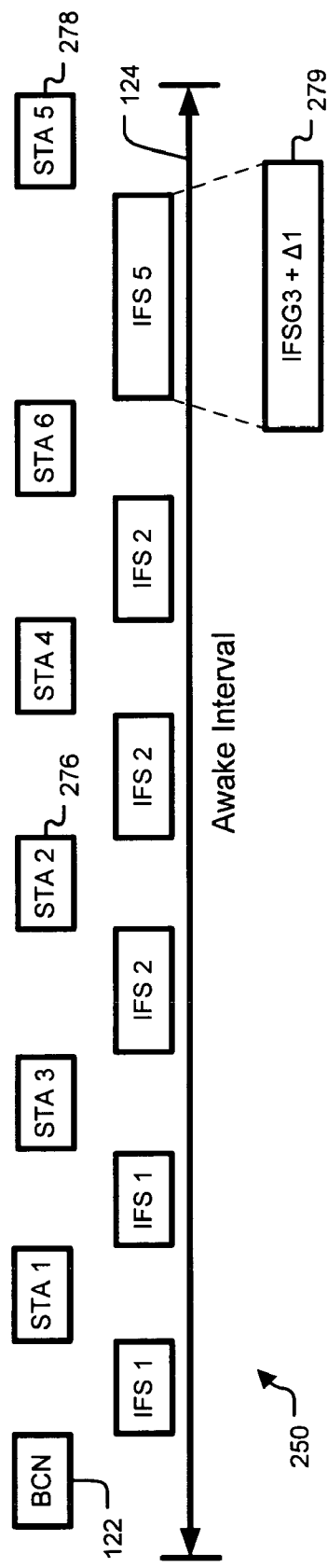
FIG. 11C is a timing diagram that illustrates client station IFS times in a wireless LAN according to a third implementation of the present invention.

Referring now to FIG. 11C, the timing diagram 250 illustrates the operation of the client stations in the event that multiple client stations do not properly receive a data packet from a corresponding client station in a preceding group. In the present example, the fourth, fifth, and sixth client stations do not properly receive the data packet from the third client station. The first and third client stations use the IFS time 1 as described above. However, the fifth client station does not properly receive the data packet from the third client station, and therefore waits IFS time 5. The second client station waits IFS time 2, which is shorter than IFS time 5. Therefore, the second client station preempts the fifth client station and transmits after IFS time 2 as illustrated at 276. The fourth and sixth client stations reuse the IFS time 2 of the second client station. After the transmission medium is free following the transmission from the sixth client station, the fifth client station transmits a data packet after IFS time 5 as illustrated at 278. The IFS time 5 is equivalent to the group IFS time IFSG3 plus the incremental delta time Δ1 as illustrated at 279.

Figure 11D:
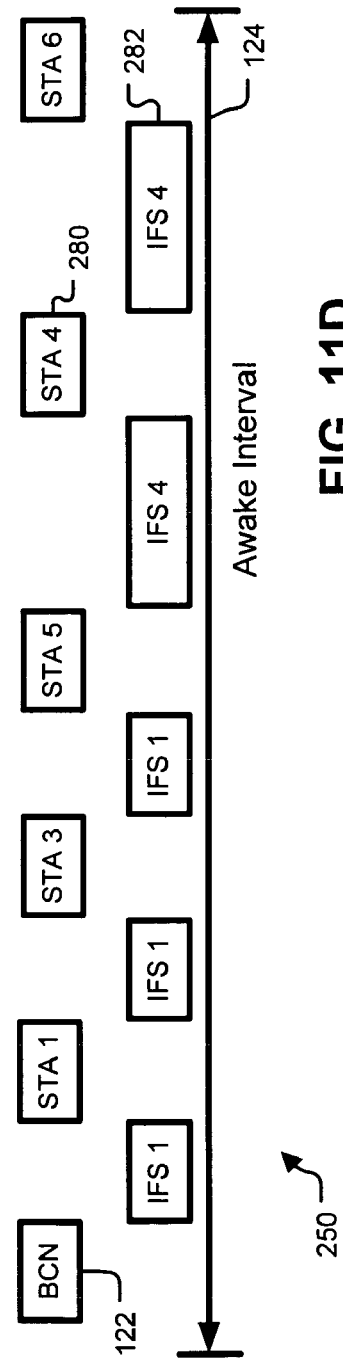
FIG. 11D is a timing diagram that illustrates client station IFS times in a wireless LAN according to a third implementation of the present invention.

Referring now to FIG. 11D, the timing diagram 250 illustrates the operation of the client stations in the event that one or more client stations stop transmitting on the network. In the present example, the second client station is no longer transmitting data packets. The first, third, and fifth client stations transmit data packets after the IFS time 1 as described in previous examples. The fourth client station does not receive a data packet from the second client station, and therefore transmits a data packet after the IFS time 4 as illustrated at 280. The sixth client station receives the data packet from the fourth client station, and is able to reuse the IFS time 4 of the fourth client station as illustrated at 282.

Figure 12:
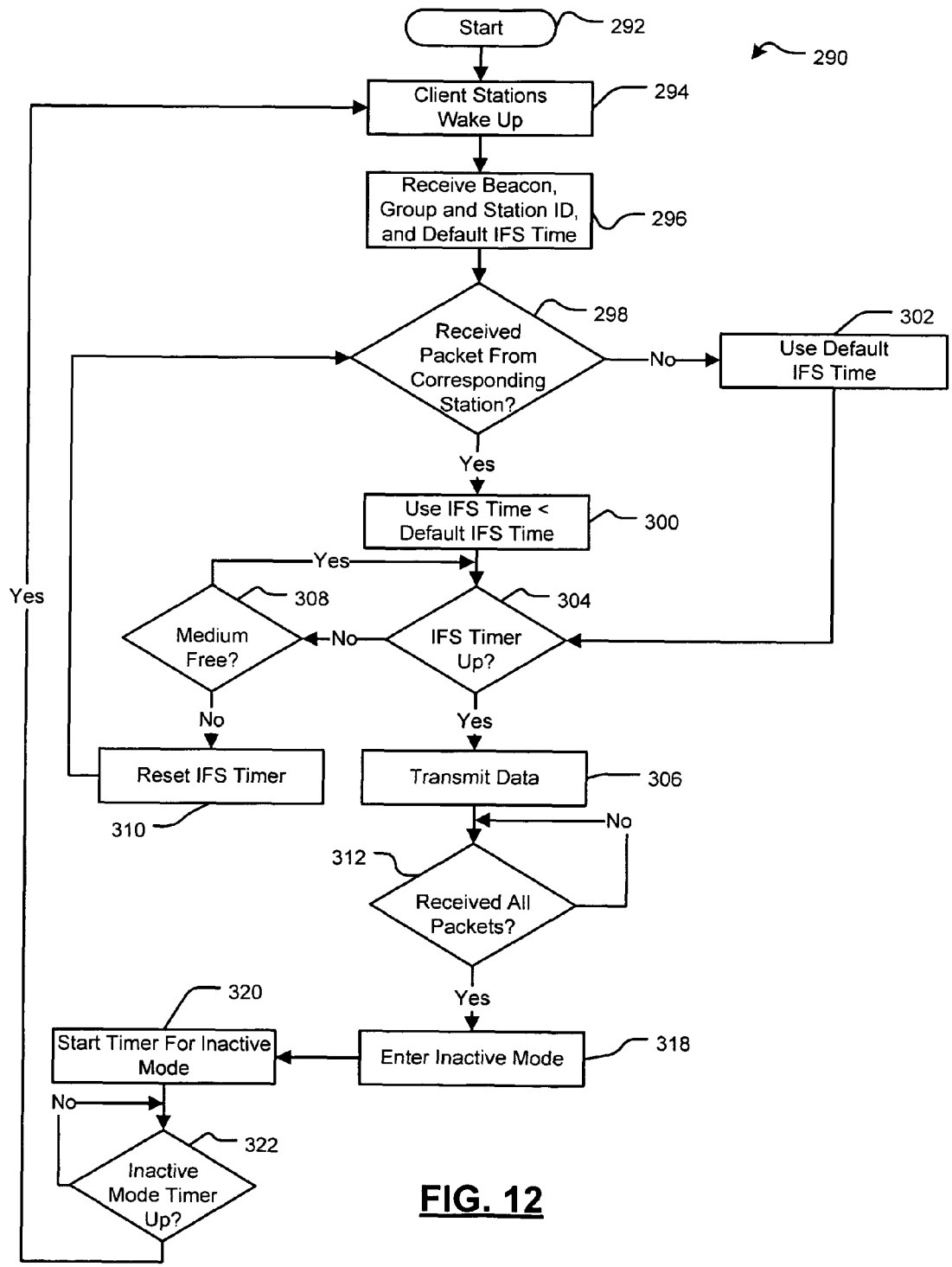
FIG. 12 is a flowchart that illustrates steps performed by a wireless network device to select client station IFS times according to a third implementation of the present invention.

Referring now to FIG. 12, a third IFS time selection method 290 begins in step 292. In step 294, the client stations come awake prior to receiving a beacon transmission. In step 296, the client stations receive the beacon signal. The beacon signal includes data that determines group and station identification numbers for each client station as described with reference to FIGS. 11A through 11C, as well as corresponding default IFS times according to the group IFS time plus the incremental delta time. Alternatively, the group and station identification numbers are pre-assigned. In step 298, a client station determines whether it received data packets from one or more client stations with a corresponding station identification number in a preceding group and received a data packet from the client station with the corresponding station identification number in the immediately preceding group. If true, the method 290 continues to step 300. If false, the method continues to step 302. In step 300, the client station reuses the shortest IFS time of a preceding client station having the same station identification number from which the client station successfully received a data packet. In step 302, the client station waits the default IFS time.

In step 304, the client station determines whether the IFS time of step 300 or step 302 is up. If true, the method 290 continues to step 306. If false, the method 290 continues to step 308. In step 308, the client station determines whether the transmission medium is free. If true, the method 290 returns to step 304. If false, the method 290 continues to step 310. In step 310, the client station resets the IFS timer, and the method 290 returns to step 298.

In step 306, the client station transmits a data packet. In step 312, the method 290 determines whether the client station has received data packets from all other client stations in the wireless network, and/or whether the beacon interval will expire soon. If true, the method 290 continues to step 318. If false, the method 290 returns to step 312 until all packets are received. In other words, if all stations have completed transmission and/or the beacon interval is to expire soon, the method 290 continues to step 318. Otherwise, the method 290 returns to step 312 and each client station attempts to transmit in this manner. In step 318, the client station enters the inactive mode. In step 320, the method 290 starts an inactive mode timer. In step 322, the method 290 determines whether the inactive mode timer is up. If true, the method 290 repeats for subsequent beacon intervals and returns to step 294. If false, the method 290 repeats step 322.

Those skilled in the art can appreciate that any suitable implementations of the methods described in FIGS. 7 through 12 can be combined. In one implementation, referring to FIGS. 11A through 11D, a subsequent client station may automatically reuse the IFS time of the corresponding client station from the immediately preceding group. In another implementation, a subsequent client station may reuse the shortest IFS time of any preceding client station provided that the subsequent client station receives data packets from all preceding stations. However, if the subsequent station does not receives all data packets, the subsequent station is still able to reuse the IFS time of a corresponding client station.

Figure 13B:
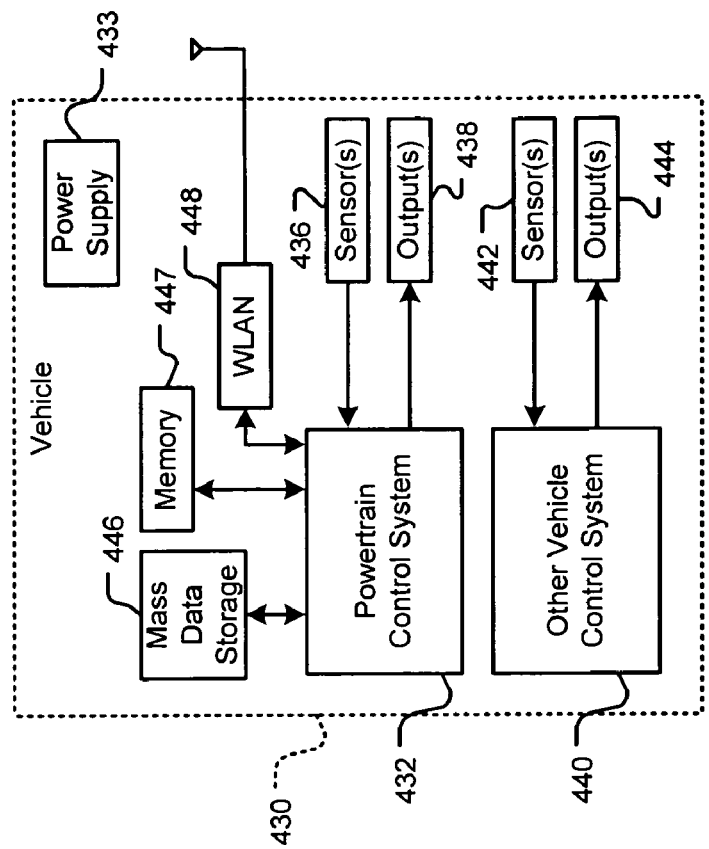
FIG. 13B is a functional block diagram of a vehicle control system.
Figure 13A:
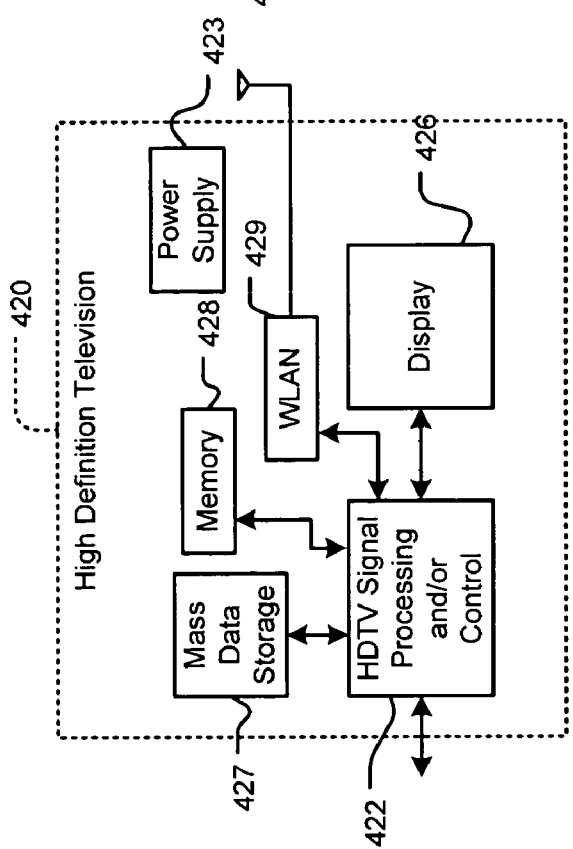
FIG. 13A is a functional block diagram of a high definition television.

Referring now to FIGS. 13A-13D, various exemplary implementations of the present invention are shown. Referring now to FIG. 13A, the present invention can be implemented in a high definition television (HDTV) 420. In particular, the present invention may implement and/or be implemented in a WLAN interface of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required. The HDTV 420 includes a power supply 423.

The HDTV 420 may communicate with mass data storage 427 that stores data in a nonvolatile manner such as optical and/or magnetic storage devices. The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Referring now to FIG. 13B, the present invention may implement and/or be implemented in a WLAN interface of control system of a vehicle 430. In some implementations, the present invention implements a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals. The vehicle 430 includes a power supply 433.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices. The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 13C:
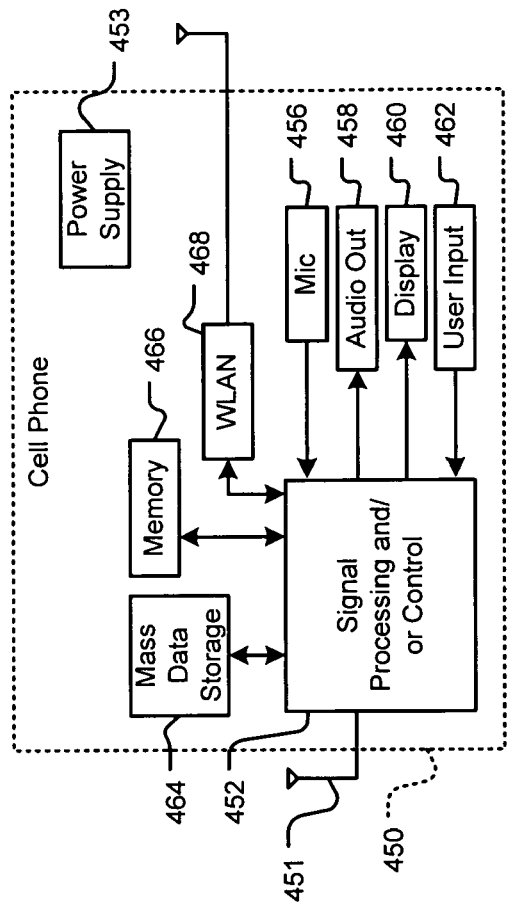
FIG. 13C is a functional block diagram of a cellular phone.

Referring now to FIG. 13C, the present invention can be implemented in a cellular phone 450 that may include a cellular antenna 451. The present invention may implement and/or be implemented in a WLAN interface of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in the cellular phone 450 may process data, perform coding and/or encryption, perform calculations, format data and/or perform other cellular phone functions. The cellular phone includes a power supply 453.

The cellular phone 450 may communicate with mass data storage 464 that stores data in a nonvolatile manner such as optical and/or magnetic storage devices. The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 13D:
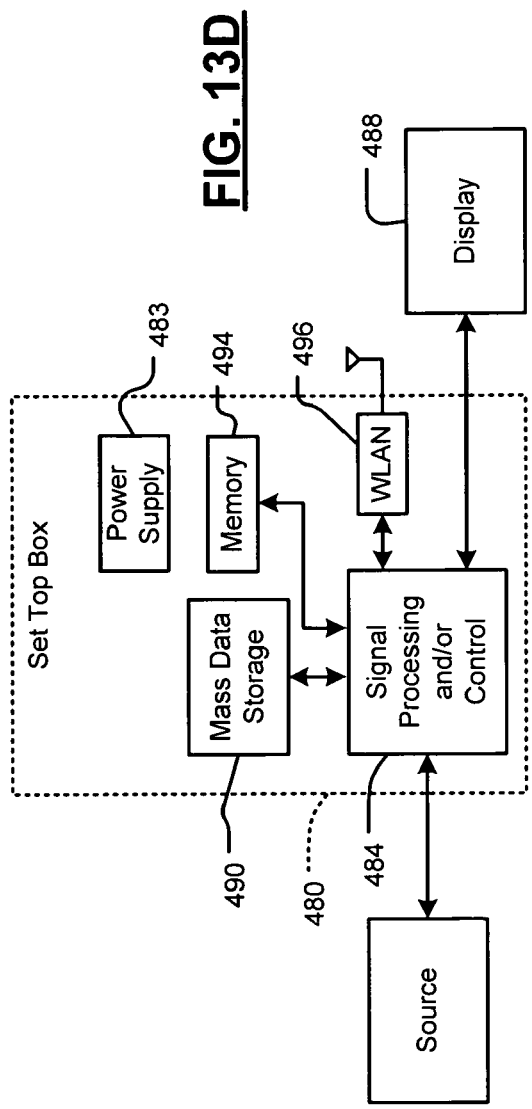
FIG. 13D is a functional block diagram of a set top box.

Referring now to FIG. 13D, the present invention can be implemented in a set top box 480. The present invention may implement and/or be implemented in a WLAN interface of the set top box 480. The set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function. The set top box 480 includes a power supply 483.

The set top box 480 may communicate with mass data storage 490 that stores data in a nonvolatile manner. The mass data storage 490 may include optical and/or magnetic storage devices such as hard disk drives HDD and/or DVDs. The set top box 480 may be connected to memory 494 such as RAM, ROM, low latency nonvolatile memory such as flash memory and/or other suitable electronic data storage. The set top box 480 also may support connections with a WLAN via a WLAN network interface 496.

While the present invention has been described in the context of IEEE standards 802.11, 802.11a, 802.11b, 802.11g, 802.11h, 802.11n, 802.16, and 802.20, the present invention has application to other current and future wireless protocols.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A first wireless network device in a wireless network that includes a plurality of wireless network devices, the first wireless network device comprising:
    a radio frequency (RF) transceiver that transmits and receives data packets and that periodically transmits or receives a beacon; and
    a control module that communicates with the RF transceiver, that determines a sequential transmission position m of the first wireless network device among the plurality of wireless network devices and a default interframe space (IFS) time based on the beacon, that selects a second IFS time when the RF transceiver receives a data packet from a second wireless network device having a sequential transmission position m−1, and that selects the default IFS time when the RF transceiver does not receive a data packet from the second wireless network device.

2. The first wireless network device of claim 1, wherein the second IFS time is less than or equal to the default IFS time.

3. The first wireless network device of claim 1, wherein the RF transceiver transmits a data packet after one of the default IFS time or the second IFS time.

4. The first wireless network device of claim 3, further comprising a power management module that transitions the first wireless network device between an active mode and an inactive mode.

5. The first wireless network device of claim 4, wherein the power management module transitions the first wireless network device to the active mode prior to a scheduled beacon time.

6. The first wireless network device of claim 5, wherein the power management module transitions the first wireless network device to the inactive mode after the RF transceiver transmits the data packet.

7. A wireless network comprising the first wireless network device of claim 4, and further comprising N wireless network devices wherein the power management module transitions the first wireless network device to the inactive mode after all of the N wireless network devices transmit a data packet, wherein N is an integer greater than 2.

8. A wireless network comprising the first wireless network device of claim 1, and further comprising a coordinator device that periodically transmits the beacon to the RF transceiver.

9. The first wireless network device of claim 1, wherein m=2 and the second IFS time is equal to a default IFS time of the second wireless network device.

10. A first wireless network device in a wireless network that includes a plurality of wireless network devices, the first wireless network comprising:
    transmitting and receiving means for transmitting and receiving data packets and for periodically transmitting or receiving a beacon; and
    control means for communicating with the transmitting and receiving means, for determining a sequential transmission position m of the first wireless network device among the plurality of wireless network devices and a default interframe space (IFS) WS time based on the beacon, for selecting a second IFS time when the transmitting and receiving means receives a data packet from a second wireless network device having a sequential transmission position m−1, and for selecting the default IFS time when the transmitting and receiving means does not receive a data packet from the second wireless network device.

11. The first wireless network device of claim 10, wherein the second IFS time is less than or equal to the default IFS time.

12. The first wireless network device of claim 10, wherein the transmitting and receiving means transmits a data packet after one of the default IFS time or the second IFS time.

13. The first wireless network device of claim 12, further comprising power management means for transitioning the first wireless network device between an active mode and an inactive mode.

14. The first wireless network device of claim 13, wherein the power management means transitions the first wireless network device to the active mode prior to a scheduled beacon time.

15. The first wireless network device of claim 14, wherein the power management means transitions the first wireless network device to the inactive mode after the transmitting and receiving means transmits the data packet.

16. A wireless network comprising the first wireless network device of claim 13, and further comprising N wireless network devices wherein the power management means transitions the first wireless network device to the inactive mode after all of the N wireless network devices transmit a data packet, wherein N is an integer greater than 2.

17. The first wireless network device of claim 10, wherein m=2 and the second IFS time is equal to a default IFS time of the second wireless network device.

18. A method for transmitting and receiving data with a first wireless network device in a wireless network that includes a plurality of wireless network devices, the method comprising:
transmitting and receiving data packets;
periodically transmitting or receiving a beacon;
determining a sequential transmission position m of the first wireless network device among the plurality of wireless network devices and a default interframe space (IFS) time based on the beacon;
selecting a second IFS time when the first wireless network device receives a data packet from a second wireless network device having a sequential transmission position m−1; and
selecting the default IFS time when the first wireless network device does not receive a data packet from the second wireless network device.

19. The method of claim 18, wherein the second IFS time is less than or equal to the default IFS time.

20. The method of claim 18, further comprising transmitting a data packet after one of the default IFS time or the second IFS time.

21. The method of claim 20, further comprising transitioning the first wireless network device between an active mode and an inactive mode.

22. The method of claim 21, wherein transitioning the first wireless network device between the active mode and the inactive mode includes transitioning the first wireless network device to the active mode prior to a scheduled beacon time.

23. The method of claim 22, wherein transitioning the first wireless network device between the active mode and the inactive mode includes transitioning the first wireless network device to the inactive mode after the first wireless network device transmits the data packet.

24. The method of claim 21, wherein the wireless network includes N wireless network devices, the method further comprising transitioning the first wireless network device to the inactive mode after all of the N wireless network devices transmit a data packet, wherein N is an integer greater than 2.

25. The method of claim 18, wherein m=2 and the second IFS time is equal to a default IFS time of the second wireless network device.

* * * * *